United States Patent
Nakao et al.

(10) Patent No.: US 7,209,713 B2
(45) Date of Patent: Apr. 24, 2007

(54) TRANSMISSION METHOD AND RADIO APPARATUS FOR SUBSTANTIALLY CONSTANT RECEIVING POWER LEVEL AT A REMOTE TERMINAL

(75) Inventors: Seigo Nakao, Gifu (JP); Katsutoshi Kawai, Bisai (JP)

(73) Assignee: Sanyo Electric Co., Ltd., Osaka (JP)

( * ) Notice: Subject to any disclaimer, the term of this patent is extended or adjusted under 35 U.S.C. 154(b) by 441 days.

(21) Appl. No.: 10/808,474

(22) Filed: Mar. 25, 2004

(65) Prior Publication Data

US 2004/0192239 A1  Sep. 30, 2004

(30) Foreign Application Priority Data

Mar. 27, 2003  (JP) .......................... P2003-088728

(51) Int. Cl.
*H04B 1/00* (2006.01)
(52) U.S. Cl. .................. 455/69; 455/101; 455/13.3; 375/346; 375/347; 370/334
(58) Field of Classification Search ............. 455/138, 455/424, 425, 456.5, 456.6, 550.1, 575.1, 455/561, 13.3, 101, 13.4, 115.3, 522, 525, 455/67.11, 69, 562.1, 132, 135, 161.3, 276.1, 455/277.1, 63.4, 504, 103, 277.2, 272, 88, 455/24, 25, 65, 67.1, 136; 375/347, 349, 375/220, 219, 221, 264, 261, 285, 146, 346; 370/334, 342, 335, 339, 343, 345, 252, 329, 370/331, 332; 342/378, 828, 850, 853, 380, 342/383, 382, 372, 368

See application file for complete search history.

(56) References Cited

U.S. PATENT DOCUMENTS 5,535,238 A  7/1996  Schilling et al.

6,049,307 A * 4/2000 Lim ........................... 342/383

(Continued)

FOREIGN PATENT DOCUMENTS

JP        2002-22611 A    1/2002

OTHER PUBLICATIONS

Chinese Office Action for Corresonding Application No. 200410031477.2.

*Primary Examiner*—Edward F. Urban
*Assistant Examiner*—Charles Chow
(74) *Attorney, Agent, or Firm*—McDermott Will & Emery LLP

(57) ABSTRACT

A transmission weight vector computing unit computes transmission weight vectors. A transmission weight vector correcting unit obtains a corrected transmission weight vector W'(t). A predicted receiving power computing unit computes a predicted receiving power value Y(t). If a difference between the predicted receiving power value Y(t) and a predicted receiving power value in the past Y(t-T) is less than a threshold value, an update unit selects the corrected transmission weight vector W'(t). If, on the other hand, the difference is greater or equal to the threshold value, the update unit selects a corrected weight vector in the past W'(t-xT). If the modulation method is QPSK, a setting unit selects the transmission weight vector W(t). If the modulation method is 16 QAM, the setting unit selects the corrected transmission weight vector W'(t) or W'(t-xT) and outputs it as a final transmission weight vector signal.

33 Claims, 13 Drawing Sheets

U.S. PATENT DOCUMENTS

| | | | |
|---|---|---|---|
| 6,192,256 B1 * | 2/2001 | Whinnett | 455/562.1 |
| 6,434,366 B1 * | 8/2002 | Harrison et al. | 455/69 |
| 6,512,917 B1 * | 1/2003 | Hiramatsu | 455/69 |
| 6,763,062 B1 * | 7/2004 | Kohno et al. | 375/220 |
| 6,893,009 B2 * | 5/2005 | Brehm et al. | 267/64.24 |
| 6,940,840 B2 * | 9/2005 | Ozluturk et al. | 370/335 |
| 7,020,455 B2 * | 3/2006 | Krishnarajah et al. | 455/410 |
| 2002/0039912 A1 * | 4/2002 | Yamaguchi et al. | 455/561 |
| 2002/0070892 A1 * | 6/2002 | Kikuchi | 342/368 |
| 2003/0148744 A1 * | 8/2003 | Ide et al. | 455/101 |
| 2004/0235421 A1 * | 11/2004 | Matsuoka et al. | 455/63.4 |
| 2004/0240410 A1 * | 12/2004 | Hayashi et al. | 370/329 |

\* cited by examiner

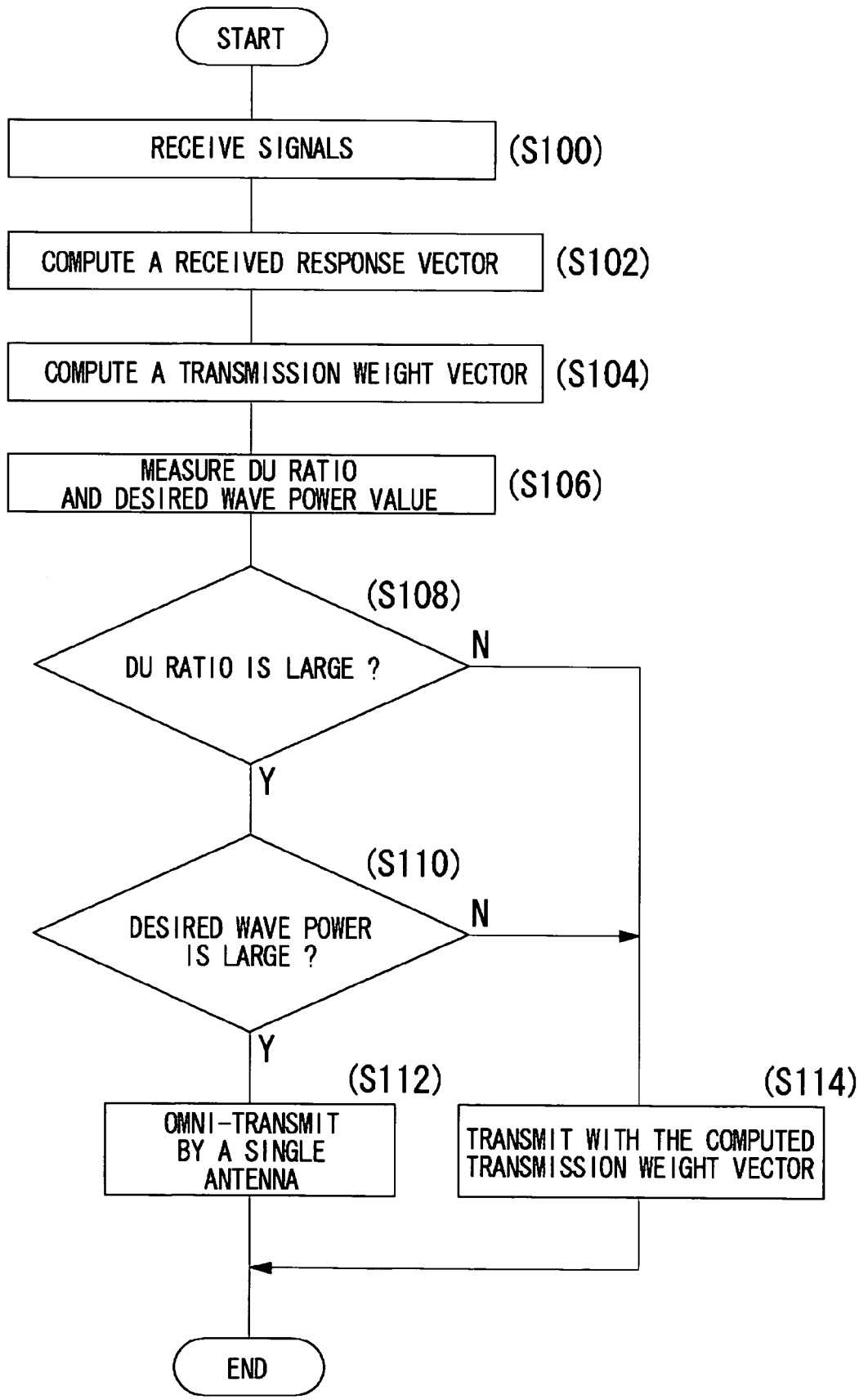

TRANSMISSION METHOD AND RADIO APPARATUS FOR SUBSTANTIALLY CONSTANT RECEIVING POWER LEVEL AT A REMOTE TERMINAL

BACKGROUND OF THE INVENTION

1. Field of the Invention

The present invention relates to transmission method and radio apparatus utilizing said method, and it particularly relates to a transmission method in which a control is performed so that the transmitted signals are received with nearly constant power, and a radio apparatus utilizing said method.

2. Description of the Related Art

The adaptive array antenna changes successively the directivity of antenna in accordance with the position of an apparatus, which is targeted party to the communication, and the propagation environment so as to improve the communication quality and increase the number of users that can be handled. When the transmission power control is applied to the adaptive array antenna, the increased error in the control may result from the fluctuation of directional gain, which cannot be controlled by merely raising or reducing the transmission power. That is, although the targeted communication apparatus can receive signals with the sufficiently large power if the directional gain is large, there is a possibility that interference is caused in other communication apparatuses. On the other hand, if the directional gain is small, the targeted communication apparatus cannot receive the sufficient power, so that the communication quality deteriorates.

According to the conventional transmission power control technology applied to the adaptive array antennas, the directional gain is calculated from the received weight and the transmission array response vector, which is information on the position of antenna normalized by the transmission carrier frequency. Then, the correction value of amplitude in the transmission weight is computed so that the directional gain becomes a desired value. And when transmitting signals, the transmission power control is carried out using the correction value of amplitude in the transmission weight (for example, see Reference (1) in the following Related Art List).

Related Art List (1) Japanese Patent Application Laid-Open No. 2000-22611.

Under these circumstances, the inventors of the present invention came to recognize the following problems. In the adaptive array antenna, the directivity of antenna is generally narrowed in the direction where the targeted communication apparatus is present, based on the received response vectors or the received weight vectors which were obtained as the receiving results, so as to transmit the signals. Further, simultaneously executed is the null steering where the control is carried out in order not to cause interference. If the interference signal components in the signals received by the adaptive array antenna are relatively small or none, it is possible that the null in the null steering is steered toward the randomly varying noise.

Influenced by the fluctuation in the null direction in the directivity of antenna, the power of signals in the direction of the targeted communication apparatus is greatly varied. If the AGC (Automatic Gain Control) provided in the targeted communication apparatus cannot keep track of and follow up on the fluctuation in the received power, the communication quality generally degrades. If, on the other hand, the fluctuation in the propagation environment is small, it is possible that the degradation of the communication quality is small even if the direction in the directivity of antenna is not changed successively. If predetermined information is not added to the amplitude component of a signal to be transmitted, the degradation of the communication quality due to the fluctuation of the received power in the targeted communication apparatus is smaller compared to the case where the predetermined information is attached to the amplitude component.

SUMMARY OF THE INVENTION

The present invention has been made in recognition of such circumstances and an object thereof is to provide a transmission method in which the transmission power is so controlled that the received power in the targeted communication apparatus remains constant, and a radio apparatus utilizing said transmission method. Another object thereof is to provide a transmission method using transmission weight vectors that reduce the influence by noise and a radio apparatus utilizing it. Still another object thereof is to provide a transmission method in which the directivity of antenna is changed according to the modulation method used for signals to be transmitted, and a radio apparatus utilizing it.

A preferred embodiment according to the present invention relates to a radio apparatus. This apparatus includes: a receiver which receives signals from a predetermined terminal apparatus; a received response characteristics computing unit which calculates, from the signals received by the receiver, a received response characteristic for the terminal apparatus; a transmission weight factor computing unit which computes, from the signals received by the receiver, a candidate of transmission weight factor for the terminal apparatus; a predicted power computing unit which computes, from the candidate of transmission weight factor and the received response characteristic, a predicted receiving power value in the terminal apparatus; a storage which stores the predicted receiving power value computed by the predicted power computing unit; a setting unit which updates and sets the transmission weight factor to the candidate of transmission weight factor computed by the transmission weight factor computing unit if a difference between a predicted receiving power value in the past stored in the storage and the predicted receiving power value computed by the predicted power computing unit is less than a predetermined threshold value and which sets without updating the transmission weight factor if the difference thereof is greater than or equal to the predetermined threshold value; and a transmitter which transmits signals to the terminal apparatus based on the transmission weight factor set by the setting unit.

By employing the above apparatus, the transmission weight factor is not updated if the predicted receiving power value for the terminal apparatus fluctuates greatly. Thus, the large fluctuation, of the received power in the terminal apparatus, due to the error in the transmission weight factor can be reduced.

Another preferred embodiment according to the present invention relates also to a radio apparatus. This apparatus includes: a receiver which receives signals from a predetermined terminal apparatus; a received response characteristics computing unit which calculates, from the signals received by the receiver, a received response characteristic for the terminal apparatus; a transmission weight factor computing unit which computes, from the signals received by the receiver, a candidate of transmission weight factor for the terminal apparatus; a correction unit which corrects the candidate of transmission weight factor in a manner such that a relationship between the candidate of transmission weight factor and the received response characteristic comes close to a predetermined value in a prescribed range of values; a predicted power computing unit which computes, from the corrected candidate of transmission weight factor and the received response characteristic, a predicted receiving power value in the terminal apparatus; a storage which stores the predicted receiving power value computed by the predicted power computing unit; a setting unit which updates and sets the transmission weight factor with the corrected candidate of transmission weight factor computed by the transmission weight factor computing unit if a difference between a predicted receiving power value in the past stored in the storage and the predicted receiving power value computed by the predicted power computing unit is less than a predetermined threshold value and which sets without updating the transmission weight factor if the difference thereof is greater than or equal to the predetermined threshold value; and a transmitter which transmits signals to the terminal apparatus based on the transmission weight factor set by the setting unit.

By employing the above apparatus, the transmission power is properly controlled, and the transmission weight factor is not updated if the predicted receiving power value for the terminal apparatus fluctuates greatly. Thus, the large fluctuation, of the received power in the terminal apparatus, due to the error in the transmission weight factor can be reduced.

If the transmission weight factor is set, without having been updated, for longer than a predetermined period of time, the setting unit may update the transmission weight factor irrespective of the difference between the predicted receiving power value in the past stored in the storage and the computed predicted receiving power value.

Still another preferred embodiment according to the present invention relates also to a radio apparatus. This apparatus includes: a receiver which receives signals from a predetermined terminal apparatus; a received response characteristics computing unit which calculates, from the signals received by the receiver, a received response characteristic for the terminal apparatus; a transmission weight factor computing unit which computes, from the signals received by the receiver, a first candidate of transmission weight factor for the terminal apparatus; correction unit which corrects the first candidate of transmission weight factor in a manner such that a relationship between the first candidate of transmission weight factor and the received response characteristic comes close to a predetermined value in a prescribed range of values; a predicted power computing unit which computes, from the corrected first candidate of transmission weight factor and the received response characteristic, a predicted receiving power value in the terminal apparatus; a storage which stores the predicted receiving power value computed by the predicted power computing unit; a setting unit which sets the transmission weight factor to the corrected first candidate of transmission weight factor by updating a second candidate of transmission weight factor if a difference between a predicted receiving power value in the past stored in the storage and the predicted receiving power value computed by the predicted power computing unit is less than a predetermined threshold value and which sets without updating the second candidate of transmission weight factor if the difference thereof is greater than or equal to the predetermined threshold value; an information input unit which inputs information to signals to be transmitted; a setting unit which sets, based on the information inputted to signals to be transmitted, either the first candidate of transmission weight factor or the second candidate of transmission weight factor as a transmission weight factor; and a transmitter which transmits signals to the terminal apparatus based on the transmission weight factor set by the setting unit.

By employing the above apparatus, the transmission weight factor is not updated if the predicted receiving power value for the terminal apparatus fluctuates greatly. Thus, the large fluctuation, of the received power in the terminal apparatus, due to the error in the transmission weight factor can be reduced. Furthermore, the signals are transmitted with the maximum gain without any power control if the large fluctuation of the received power in the terminal apparatus does not cause any problem. Thus, the terminal apparatus can receive the signals with larger power.

If the transmission weight factor is set, without the second candidate of transmission weight factor having been updated, for longer than a predetermined period of time, the setting unit may set by updating the second candidate of transmission weight factor irrespective of the difference between the predicted receiving power value in the past stored in the storage and the computed predicted receiving power value.

As the information inputted to signals to be transmitted, the information input unit may input information indicative of whether or not predetermined information is contained in an amplitude component of a signal to be transmitted. And the setting unit may set the first candidate of transmission weight factor as the transmission weight factor if the predetermined information is not contained in the amplitude component of a signal to be transmitted, whereas the setting unit may set the second candidate of transmission weight factor as the transmission weight factor if the predetermined information is contained in the amplitude component of the signal to be transmitted.

The radio apparatus may further include a measuring unit which measures the magnitude of variation in power of the received signals during a predetermined period. In this apparatus, as the information inputted to signals to be transmitted the information input unit may input the magnitude of variation in power. And the setting unit may set the first candidate of transmission weight factor as the transmission weight factor if the magnitude of variation in power is less than a predetermined threshold value, whereas the setting unit may set the second candidate of transmission weight factor as the transmission weight factor if the magnitude of variation in power is greater than or equal to the predetermined threshold value.

The radio apparatus may further include a measuring unit which measures a power value of the received signal. In this apparatus, the information input unit may input the power value as the information inputted to signals to be transmitted. And, the setting unit may set the first candidate of transmission weight factor as the transmission weight factor if the power value is less than a predetermined threshold value, whereas the setting unit may set the second candidate of transmission weight factor as the transmission weight factor if the power value is greater than or equal to the predetermined threshold value.

The radio apparatus may further include a measuring unit which measures a power ratio of a power value of the signal received from the terminal apparatus to that of signals received from other terminal apparatus. In this apparatus, the information input unit may input the power ratio as the information inputted to signals to be transmitted. And the setting unit may set the first candidate of transmission weight factor as the transmission weight factor if the power ratio is less than a predetermined threshold value, whereas the setting unit may set the second candidate of transmission weight factor as the transmission weight factor if the power ratio is greater than or equal to the predetermined threshold value.

Still another preferred embodiment according to the present invention relates also to a radio apparatus. This apparatus includes: a receiver which receives signals from a terminal apparatus via a plurality of antennas; a measuring unit which measures the magnitude of variation in power of the received signals; a transmission weight factor computing unit which computes, from the received signals, a transmission weight factor for the terminal apparatus; and a transmitter which transmits signals, based on the transmission weight factor computed by the transmission weight factor computing unit, via the plurality of antennas if the magnitude of variation in power measured by the measuring unit is less than a predetermined threshold value and which transmits signals via one of the plurality of antennas if the magnitude of variation in power measured by the measuring unit is greater than or equal to a predetermined threshold value.

By employing the above apparatus, the signals are transmitted from one fixed antenna if the magnitude of variation in power is large. Thus, the signal with a constant power can be transmitted with a simplified processing performed thereon.

Still another preferred embodiment according to the present invention relates to a transmission method. This method is such that, based on a received signal from a radio apparatus which is a targeted communication party, a transmission weight factor for the radio apparatus is computed, the magnitude of variation in reception power of the radio apparatus from the received signal and the computed transmission weight factor is estimated, and signals are transmitted to the radio apparatus with the computed transmission weight factor if the magnitude of variation in the reception power is less than a predetermined threshold value and signals are transmitted to the radio apparatus with a transmission weight factor that has been used so far if the magnitude of variation in the reception power is greater than or equal to the predetermined threshold value.

Still another preferred embodiment according to the present invention relates also to a transmission method. This method includes: receiving signals from a predetermined terminal apparatus; calculating from the received signals a received response characteristic for the terminal apparatus; computing from the received signals a candidate of transmission weight factor for the terminal apparatus; computing, from the candidate of transmission weight factor and the received response characteristic, a predicted receiving power value in the terminal apparatus; storing the computed predicted receiving power value in a storage; setting by updating the transmission weight factor with the computed candidate of transmission weight factor if a difference between a predicted receiving power value in the past stored in the storage and the predicted receiving power value computed by the computing a predicted receiving power value is less than a predetermined threshold value, and setting without updating the transmission weight factor if the difference thereof is greater than or equal to the predetermined threshold value; and transmitting signals to the terminal apparatus based on the transmission weight factor set by the setting.

Still another preferred embodiment according to the present invention relates also to a transmission method. This method includes: receiving signals from a predetermined terminal apparatus; calculating from the received signals a received response characteristic for the terminal apparatus; computing from the received signals a candidate of transmission weight factor for the terminal apparatus; correcting the candidate of transmission weight factor in a manner such that a relationship between the candidate of transmission weight factor and the received response characteristic comes close to a predetermined value in a prescribed range of values; computing, from the corrected candidate of transmission weight factor and the received response characteristic, a predicted receiving power value in the terminal apparatus; storing the computed predicted receiving power value in a storage; setting by updating the transmission weight factor with the corrected candidate of transmission weight factor if a difference between a predicted receiving power value in the past stored in the storage and the predicted receiving power value computed by the computing a predicted receiving power value is less than a predetermined threshold value, and setting without updating the transmission weight factor if the difference thereof is greater than or equal to the predetermined threshold value; and transmitting signals to the terminal apparatus based on the transmission weight factor set by the setting.

If the transmission weight factor is set, without having been updated, for longer than a predetermined period of time, the setting may be such that the transmission weight factor is updated irrespective of the difference between the predicted receiving power value in the past stored in the storage and the computed predicted receiving power value.

Still another preferred embodiment according to the present invention relates also to a transmission method. This method includes: receiving signals from a predetermined terminal apparatus; calculating from the received signals a received response characteristic for the terminal apparatus; computing from the received signals a first candidate of transmission weight factor for the terminal apparatus; correcting the first candidate of transmission weight factor in a manner such that a relationship between the first candidate of transmission weight factor and the received response characteristic comes close to a predetermined value in a prescribed range of values; computing, from the corrected first candidate of transmission weight factor and the received response characteristic, a predicted receiving power value in the terminal apparatus; storing the computed predicted receiving power value in a storage; setting by updating a second candidate of transmission weight factor with the corrected first candidate of transmission weight factor by the second candidate of transmission weight factor if a difference between a predicted receiving power value in the past stored in the storage and the predicted receiving power value computed by the computing predicted receiving power value is less than a predetermined threshold value, and setting without updating the second candidate of transmission weight factor if the difference thereof is greater than or equal to the predetermined threshold value; inputting information to signals to be transmitted; setting, based on the information inputted signals to be transmitted, either the first candidate of transmission weight factor or the second candidate of transmission weight factor as a transmission weight factor; and transmitting signals to the terminal apparatus based on the transmission weight factor set by the setting.

If the transmission weight factor is set, without the second candidate of transmission weight factor having been updated, for longer than a predetermined period of time, the setting by or without updating may be such that the setting is done by updating the second candidate of transmission weight factor irrespective of the difference between the predicted receiving power value in the past stored in the storage and the thus computed predicted receiving power value.

As the information inputted to signals to be transmitted, the inputting may input information indicative of whether or not predetermined information is contained in an amplitude component of a signal to be transmitted, and the setting may set the first candidate of transmission weight factor as the transmission weight factor if the predetermined information is not contained in the amplitude component of the signal to be transmitted, whereas the setting may set the second candidate of transmission weight factor as the transmission weight factor if the predetermined information is contained in the amplitude component of a signal to be transmitted.

The transmission method may further include measuring the magnitude of variation in power of the received signals during a predetermined period. In this method, as the information inputted to signals to be transmitted the inputting information may input the magnitude of variation in power, and the setting may set the first candidate of transmission weight factor as the transmission weight factor if the magnitude of variation in power is less than a predetermined threshold value, whereas the setting may set the second candidate of transmission weight factor as the transmission weight factor if the magnitude of variation in power is greater than or equal to the predetermined threshold value.

The transmission method may further include measuring a power value of the received signal. In this method, as the information inputted to signals to be transmitted the inputting information may input the power value, and the setting may set the first candidate of transmission weight factor as the transmission weight factor if the power value is less than a predetermined threshold value, whereas the setting may set the second candidate of transmission weight factor as the transmission weight factor if the power value is greater than or equal to the predetermined threshold value.

The transmission method may further include measuring a power ratio of a power value of the signal received from the terminal apparatus to that of signals received from other terminal apparatus. In this method, as the information inputted to signals to be transmitted the inputting information may input the power ratio, and the setting may set the first candidate of transmission weight factor as the transmission weight factor if the power ratio is less than a predetermined threshold value, whereas the setting may set the second candidate of transmission weight factor as the transmission weight factor if the power ratio is greater than or equal to the predetermined threshold value.

Still another preferred embodiment according to the present invention relates also to a transmission method. This method includes: receiving signals from a terminal apparatus via a plurality of antennas; measuring the magnitude of variation in power of the received signals; computing from the received signals a transmission weight factor for the terminal apparatus; and transmitting signals, based on the transmission weight factor computed by the computing, via the plurality of antennas if the magnitude of variation in power measured by the measuring is less than a predetermined threshold value, and transmitting signals via one of the plurality of antennas if the magnitude of variation in power measured by the measuring is greater than or equal to the predetermined threshold value.

Still another preferred embodiment according to the present invention relates to a program. This program executed by a computer includes the functions of: receiving signals in a memory from a predetermined terminal apparatus; calculating, from the signals received in the memory, a received response characteristic for the terminal apparatus; computing, from the signals received in a memory, a candidate of transmission weight factor for the terminal apparatus; computing, from the candidate of transmission weight factor and the received response characteristic, a predicted receiving power value in the terminal apparatus; storing the computed predicted receiving power value in a recording device; setting by updating a memory of the transmission weight factor with the computed candidate of transmission weight factor if a difference between a predicted receiving power value in the past stored in the recording device and the predicted receiving power value computed by the computing a predicted receiving power value is less than a predetermined threshold value, and setting without updating the memory of the transmission weight factor if the difference thereof is greater than or equal to the predetermined threshold value; and transmitting signals to the terminal apparatus based on the memory of the transmission weight factor set by the setting.

Still another preferred embodiment according to the present invention relates also to a program. This program executed by a computer includes the functions of: receiving signals in a memory from a predetermined terminal apparatus; calculating, from the signals received in the memory, a received response characteristic for the terminal apparatus; computing, from the signals received in the memory, a candidate of transmission weight factor for the terminal apparatus; correcting the candidate of transmission weight factor in a manner such that a relationship between the candidate of transmission weight factor and the received response characteristic comes close to a predetermined value in a prescribed range of values; computing, from the corrected candidate of transmission weight factor and the received response characteristic, a predicted receiving power value in the terminal apparatus; storing the computed predicted receiving power value in a storage; setting by updating a memory of the transmission weight factor with the corrected candidate of transmission weight factor if a difference between a predicted receiving power value in the past stored in the storage and the predicted receiving power value computed by the computing a predicted receiving power value is less than a predetermined threshold value, and setting without updating the memory of the transmission weight factor if the difference thereof is greater than or equal to the predetermined threshold value; and transmitting signals to the terminal apparatus based on the memory of the transmission weight factor set by the setting.

If the transmission weight factor is set, without having been updated, for longer than a predetermined period of time, the setting may be such that the transmission weight factor is updated irrespective of the difference between the predicted receiving power value in the past stored in the storage and the computed predicted receiving power value.

Still another preferred embodiment according to the present invention relates also to a program. This program executed by a computer includes the functions of: receiving signals in a memory from a predetermined terminal apparatus; calculating, from the signals received in the memory, a received response characteristic for the terminal apparatus; computing, from the signals received in the memory, a first candidate of transmission weight factor for the terminal apparatus; correcting the first candidate of transmission weight factor in a manner such that a relationship between the first candidate of transmission weight factor and the received response characteristic comes close to a predetermined value in a prescribed range of values; computing, from the corrected first candidate of transmission weight factor and the received response characteristic, a predicted receiving power value in the terminal apparatus; storing the computed predicted receiving power value in a storage; setting by updating a memory of a second candidate of transmission weight factor with the corrected first candidate of transmission weight factor if a difference between a predicted receiving power value in the past stored in the storage and the predicted receiving power value computed by the computing predicted receiving power value is less than a predetermined threshold value, and setting without updating the memory of the second candidate of transmission weight factor if the difference thereof is greater than or equal to the predetermined threshold value; inputting information to signals to be transmitted; setting, based on the information inputted signals to be transmitted, either the first candidate of transmission weight factor or the second candidate of transmission weight factor to a memory of the transmission weight factor; and transmitting signals to the terminal apparatus based on the memory of the transmission weight factor set by the setting.

If the transmission weight factor is set, without the memory of the second candidate of transmission weight factor having been updated, for longer than a predetermined period of time, the setting by updating or not updating the memory of the second candidate of transmission weight factor may be such that the setting is done by updating the memory of the second candidate of transmission weight factor irrespective of the difference between the predicted receiving power value in the past stored in the storage and the thus computed predicted receiving power value.

As the information inputted to signals to be transmitted the inputting may input, to a memory, information indicative of whether or not predetermined information is contained in an amplitude component of a signal to be transmitted, and the setting may set the first candidate of transmission weight factor as the transmission weight factor if the predetermined information is not contained in the amplitude component of the signal, to be transmitted, inputted to the memory, whereas the setting may set the second candidate of transmission weight factor to the memory of the transmission weight factor if the predetermined information is contained in the amplitude component of the signal, to be transmitted, inputted to the memory.

The program may further include the function of measuring the magnitude of variation in power of the received signals during a predetermined period. In this program, as the information inputted to signals to be transmitted the inputting information may input, to a memory, the magnitude of variation in power, and the setting may set the first candidate of transmission weight factor to the memory of the transmission weight factor if the magnitude of variation in power inputted to the memory is less than a predetermined threshold value, whereas the setting may set the second candidate of transmission weight factor to the memory of the transmission weight factor if the magnitude of variation in power inputted to the memory is greater than or equal to the predetermined threshold value.

The program may further include the function of measuring a power value of the received signal. In this program, as the information inputted to signals to be transmitted the inputting information may input the power value to a memory, and the setting may set the first candidate of transmission weight factor to the memory of the transmission weight factor if the power value inputted to the memory is less than a predetermined threshold value, whereas the setting may set the second candidate of transmission weight factor to the memory of the transmission weight factor if the power value inputted to the memory is greater than or equal to the predetermined threshold value.

The program may further include the function of measuring a power ratio of a power value of the signal received from the terminal apparatus to that of signals received from other terminal apparatus. In this program, as the information inputted to signals to be transmitted the inputting information may input the power ratio to a memory, and the setting may set the first candidate of transmission weight factor to the memory of the transmission weight factor if the power ratio inputted to the memory is less than a predetermined threshold value, whereas the setting may set the second candidate of transmission weight factor to the memory of the transmission weight factor if the power ratio inputted to the memory is greater than or equal to the predetermined threshold value.

Still another preferred embodiment according to the present invention relates also to a program. This program executed by a computer includes the functions of: receiving signals in a memory from a terminal apparatus via a plurality of antennas; measuring the magnitude of variation in power of the signals received in the memory; computing, from the signals received in the memory, a transmission weight factor for the terminal apparatus; and transmitting signals, based on the computed transmission weight factor, via the plurality of antennas if the magnitude of variation in power measured by the measuring is less than a predetermined threshold value, and transmitting signals via one of the plurality of antennas if the magnitude of variation in power measured by the measuring is greater than or equal to the predetermined threshold value.

It is to be noted that any arbitrary combination of the above-described structural components and expressions converted between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 13 is a flowchart showing a procedure for setting transmission weight vectors according to the fourth embodiment of the present invention.

DETAILED DESCRIPTION OF THE INVENTION

Figure 1:
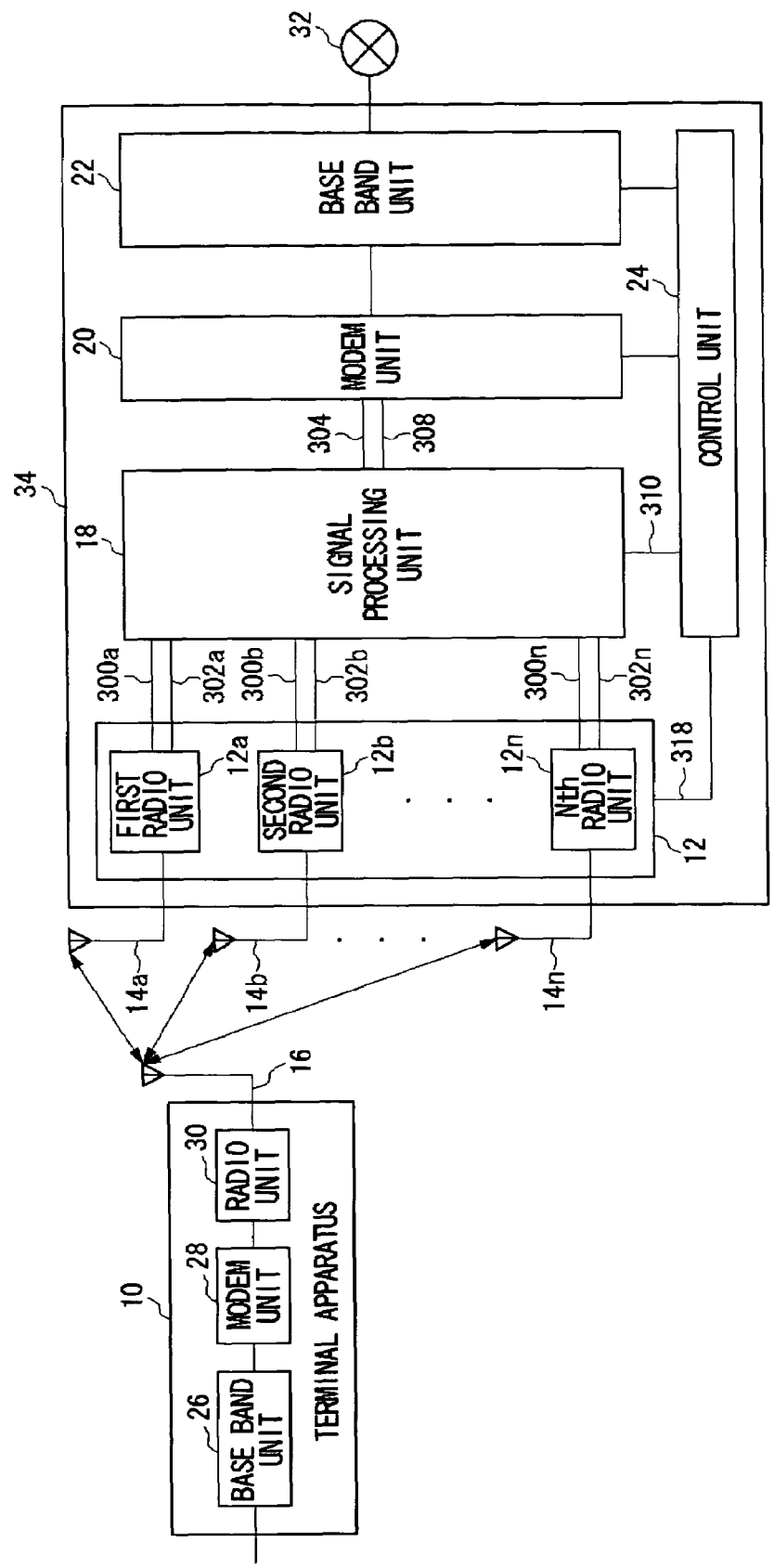
FIG. 1 shows a communication system according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

A first embodiment according to the present invention relates to a base station apparatus to which a predetermined terminal apparatus can be connected. A base station according to the present embodiment is provided with a plurality of antennas. Based on signals received, via the plurality of antennas, from a terminal apparatus which is a targeted party to the communication, the receiving processing is carried out in a manner such that an adaptive array signal processing is performed on the signals sent from the terminal apparatus using a plurality of adaptively computed weight factors (hereinafter referred to as "received weight vectors"). Further, based on the signals received via the respective antennas from the terminal apparatus, response factors (hereinafter referred to as "received response vectors") are computed, and a plurality of weight factors (hereinafter referred to as "transmission weight vectors") are derived from these received response vectors.

Signals to be transmitted are respectively weighted with the transmission weight vectors and then transmitted via the plurality of antennas to the terminal apparatus. It is assumed here that the signals to be transmitted are modulated by QPSK (Quadrature Phase Shift Keying) in which no information is contained in amplitude components or 16 QAM (Quadrature Amplitude Modulation) in which information is contained in the amplitude components. When no interference signal components is contained in the signals received via the plurality of antennas, the transmission weight vector generally changes according to randomly varying noise component. Hence, it is possible that the power value of the signal received at the terminal apparatus might vary greatly.

When the modulation method for the signals to be transmitted is 16 QAM, the base station apparatus according to the first embodiment corrects the transmission weight vectors so that a value indicative of the relationship between the transmission weight vector and the received weight vector becomes close to a predetermined value (hereinafter referred to as "corrected transmission weight vector"). It is to be noted here that the correction shall be done within a predetermined range by taking it into account that the processing is simple and readily achievable. Next, a received power value at the terminal apparatus is estimated from the corrected transmission weight vector and the received response vector. This estimated value is called a predicted receiving power value. If a difference between the predicted receiving power values calculated in the past and the current predicted receiving power value lies within a predetermined range, the signals are transmitted with the corrected transmission weight vector as a final transmission weight vector (hereinafter referred to as "final transmission weight vector"). If, on the other hand, the difference between the predicted receiving power values calculated in the past and the current predicted receiving power value lies outside the predetermined range, the signals are transmitted using the final transmission weight vector which has been used thus far, as it is.

When the modulation method for the signals to be transmitted is QPSK, the signals are transmitted with the above-described transmission weight vector as the final transmission weight vector. Since information is not contained in the amplitude components of signals, transmitting the signals with as large a transmission power as possible would lead to the improvement of communication quality, instead of controlling the transmission power.

FIG. 1 shows a communication system 150 according to the first embodiment. The communication system 150 includes a terminal apparatus 10, a base station apparatus 34 and a network 32. The terminal apparatus 10 includes a baseband unit 26, a modem unit 28, a radio unit 30 and an antenna 34 for use with terminal apparatus. The base station apparatus 34 includes a first basestation antenna 14*a*, a second basestation antenna 14*b*, . . . and an Nth basestation antenna 14*n*, which are generically named an antennas 14 for use with base station, a first radio unit 12*a*, a second radio unit 12*b*, . . . and an Nth radio unit 12*n*, which are generically named a radio unit 12, a signal processing unit 18, a modem unit 20, a baseband unit 22, a control unit 24. Moreover, the base station apparatus 34 includes, as signals, a first digital received signal 300*a*, a second digital received signal 300*b*, . . . and an Nth digital received signal 300*n*, which are generically named a digital received signal 300, a first digital transmission signal 302*a*, a second digital transmission signal 302*b*, . . . and an Nth digital transmission signal 302*n*, which are generically named a digital transmission signal 302, a synthesized signal 304, a pre-separation signal 308, a signal processing unit control signal 310 and a radio unit control signal 318.

The baseband unit 22 in the base station apparatus 34 is an interface with the network 32, and the baseband unit 26 in the terminal apparatus 10 is an interface with a PC connected to the terminal apparatus 10 or with an application within the terminal apparatus 10. They perform transmission and receiving processings of information signals to be transmitted/received by the communication system 150, respectively. They may also perform error correction or automatic retransmission processing, but the description of such processings is omitted here.

The modem unit 20 in the base station apparatus 34 and the modem unit 28 in the terminal apparatus 10 carry out modulation processing in which transmission signals are generated by modulating information signals to be transmitted. Here, $\pi/4$ shift QPSK (hereinafter referred to also as QPSK) and 16 QAM are the modulation methods considered. As a demodulation processing, the transmitted information signals are reproduced by demodulating the received signals. Here, it is assumed that differential detection is carried out for QPSK whereas the coherent detection is carried out for 16 QAM.

The signal processing unit 18 performs signal processing necessary for transmission/receiving processing by an adaptive array antenna.

The radio unit 12 in the base station apparatus 34 and the radio unit 30 in the terminal apparatus 10 carry out frequency translation processing, amplification processing, A-D or D-A conversion processing and the like between the baseband signals and radio frequency signals, which are processed by the signal processing unit 18, the modem unit 20, the baseband unit 22, the baseband unit 26 and the modem unit 28.

The basestation antenna 14 of the radio apparatus 34 and the terminal antenna 16 of the terminal apparatus 10 perform transmission/receiving processings of signals of radio frequencies. The directivity of the antennas may be arbitrary and the number of the basestation antennas 14 is assumed N.

The control unit 24 controls timings for the radio unit 12, the signal processing unit 18, the modem unit 20 and the baseband unit 22.

Figure 2:
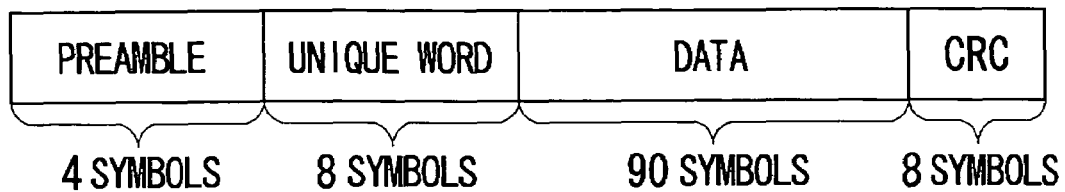
FIG. 2 shows a burst format according to the first embodiment of the present invention.

FIG. 2 shows a burst format, of a personal handyphone system (PHS), as an example of burst formats used in the first embodiment. A preamble is placed in the four leading symbols of the burst, which is used for timing synchronization. A unique word is placed in the subsequent eight symbols. The preamble and the unique word, which are known to the terminal apparatus 10 and the base station apparatus 34, can also be used as a training signal, which will be described later.

Figure 3:
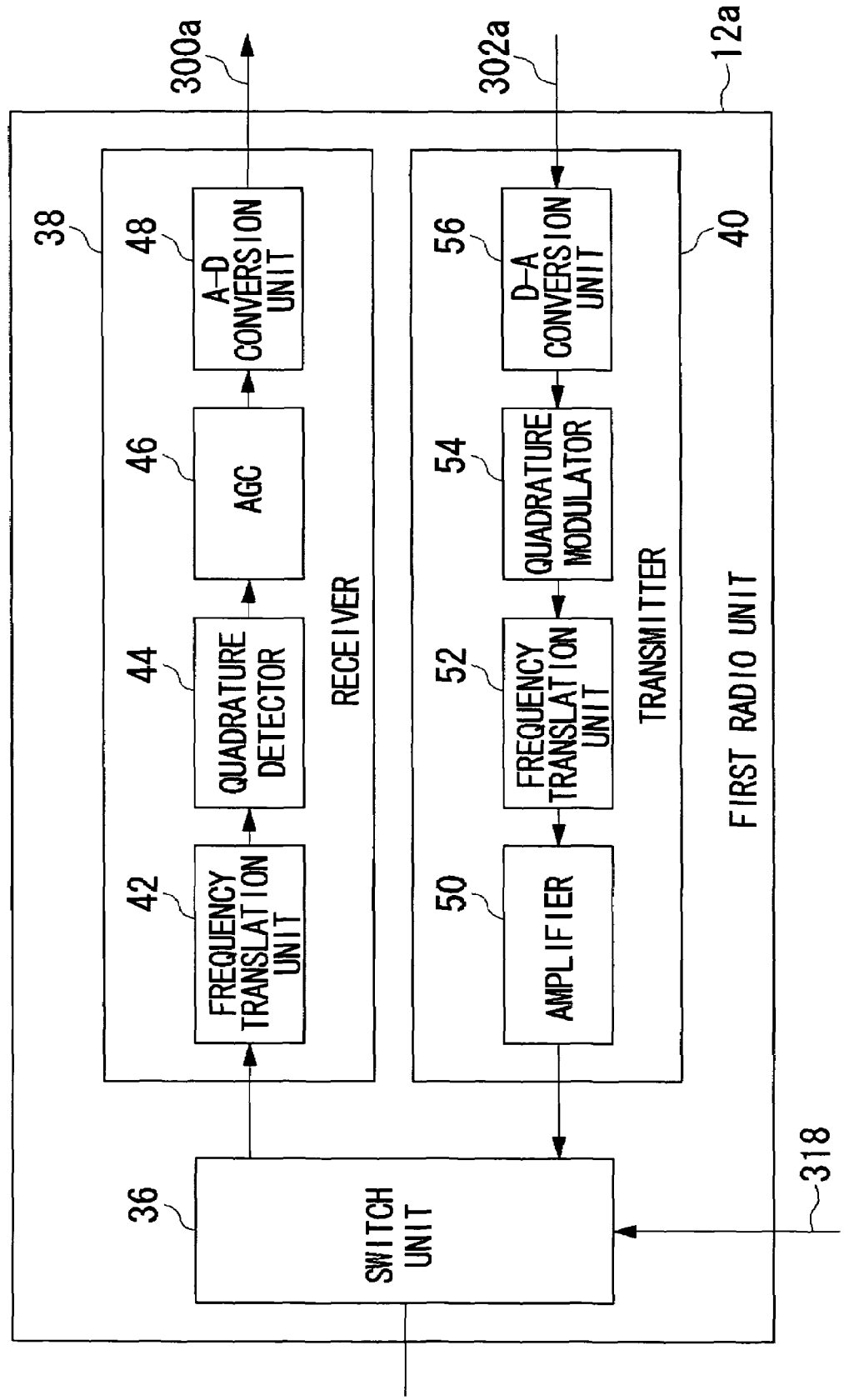
FIG. 3 shows a structure of the first radio unit shown in FIG. 1.

FIG. 3 shows a structure of the first radio unit 12a. The first radio unit 12a includes a switch unit 36, a receiver 38 and a transmitter 40. Furthermore, the receiver 38 includes a frequency translation unit 42, an quadrature detector 44, an AGC (Automatic Gain Control) 46 and an A-D conversion unit 48, whereas the transmitter 40 includes an amplifier 50, a frequency translation unit 52, an quadrature modulator 54 and a D-A conversion unit 56.

The switch unit 36 switches input and output of signals to the receiver 38 and the transmitter 40 according to the radio unit control signal 318 based on an instruction from the control unit 24.

The frequency translation unit 42 in the receiver 38 and the frequency translation unit 52 in the transmitter 40 perform frequency translation between signals of radio frequencies and signals of one or more intermediate frequencies.

The quadrature detector 44 generates baseband analog signals from intermediate frequency signals through orthogonal detection. On the other hand, the quadrature modulator 54 generates intermediate frequency signals from baseband analog signals through quadrature modulation.

The AGC 46 automatically controls gain to make the amplitude of baseband analog signals an amplitude within the dynamic range of the A-D conversion unit 48.

The A-D conversion unit 48 converts baseband analog signals into digital signals, and the D-A conversion unit 56 converts baseband digital signals into analog signals. Hereinbelow, the digital signals outputted from the A-D conversion unit 48 are called digital received signals 300, and the digital signals inputted to the D-A conversion unit 56 are called digital transmission signals 302.

The amplifier 50 amplifies radio frequency signals to be transmitted.

Figure 4:
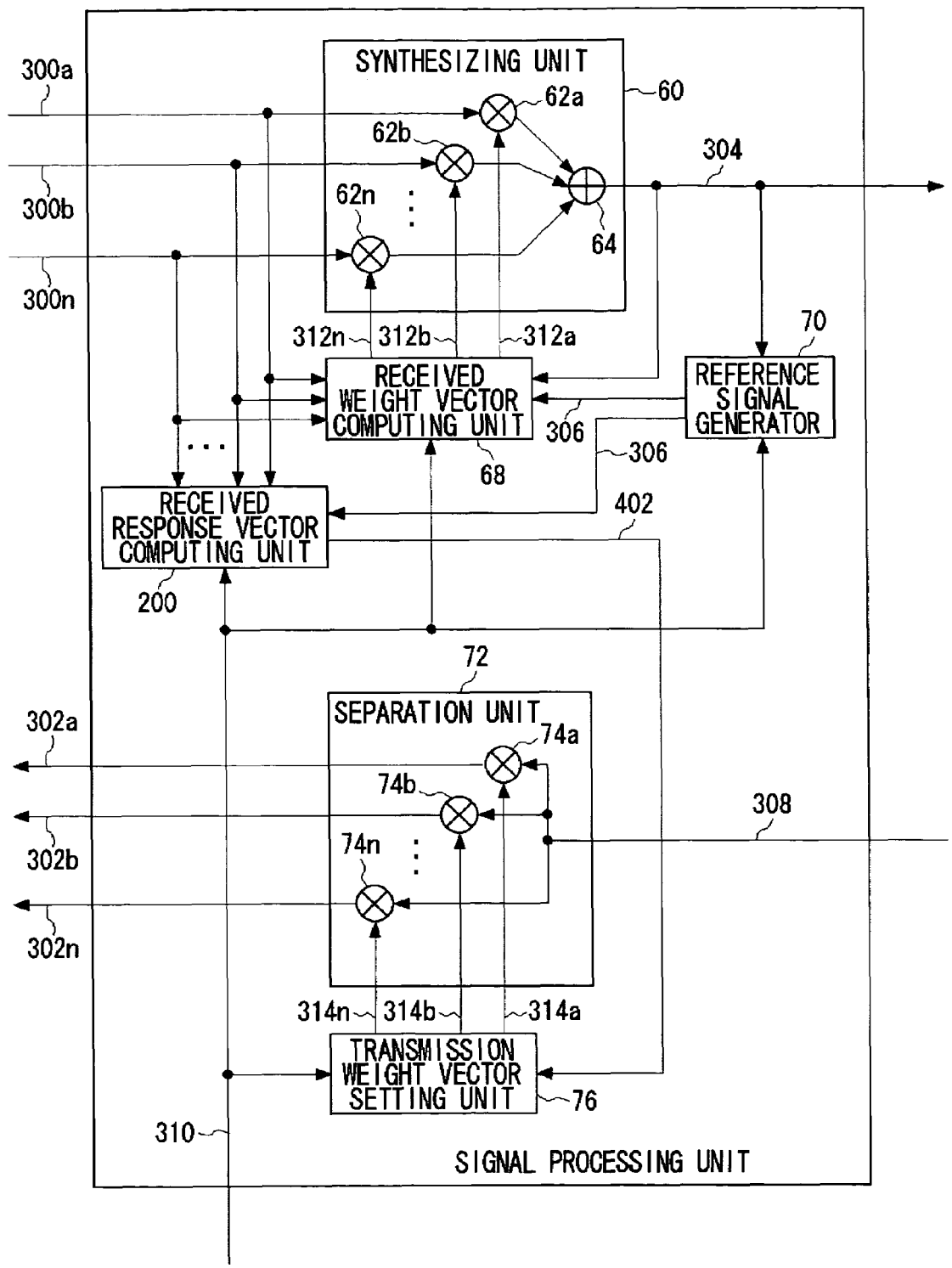
FIG. 4 shows a structure of the signal processing unit shown in FIG. 1.

FIG. 4 shows a structure of the signal processing unit 18. The signal processing unit 18 includes a synthesizing unit 60, a received weight vector computing unit 68, a reference signal generator 70, a received response vector computing unit 200, a separation unit 72 and a transmission weight vector setting unit 76. The synthesizing unit 60 includes a first multiplication unit 62a, a second multiplication unit 62b, ... and an Nth multiplication unit 62n, which are generically named a multiplication unit 62, and an addition unit 64. The separation unit 72 includes a first multiplication unit 74a, a second multiplication unit 74b, ... and an Nth multiplication unit 74n, which are generically named a multiplication unit 74.

The signals used include a reference signal 306, a received response vector 402, a first received weight vector signal 312a, a second received weight vector signal 312b, ... and an Nth received weight vector signal 312n, which are generically named a received weight vector signal 312, a first final transmission weight vector signal 314a, a second final transmission weight vector signal 314b, ... and an Nth final transmission weight vector signal 314n, which are generically named a final transmission weight vector signal 314.

The received weight vector computing unit 68 computes, from the digital received signals 300 and the reference signals 306, the received weight vector signals 312 necessary for weighting the digital received signals 300, using an adaptive algorithm, such as RLS (Recursive Least Squares) algorithm or LMS (Least Mean Squares) algorithm.

The synthesizing unit 60 weights the digital received signals 300 by the received weight vector signals 312 at the multiplication units 62, then adds them up by the addition unit 64 and outputs a synthesized signal 304.

During a training period, the reference signal generator 70 outputs a training signal stored beforehand as a reference signal 306. After the training period, the synthesized signal 304 is compared beforehand with a prescribed threshold value and is then decided. Its result of this decision is outputted as a reference signal 306. The decision may not necessarily be a hard decision but it may also be a soft decision.

The received response vector computing unit 200 computes the received response vectors 402 as the received response characteristic of received signals in relation to transmitted signals, from the digital received signals 300 and reference signal 306. A method for computing them will be described later.

The transmission weight vector setting unit 76 estimates the final transmission weight vector signal 314 necessary for weighting a pre-separation signal 308, from the received response vector 402 which represents the received response characteristic, using a method described later.

The separation unit 72 weights the pre-separation signal 308 with the final transmission weight vector signal 314 at the multiplication units 74 and outputs digital transmission signals 302.

In terms of hardware, the above-described structure can be realized by a CPU, a memory and other LSIs of an arbitrary computer. In terms of software, it can be realized by memory-loaded programs which have managing and scheduling functions or the like, but drawn and described here are function blocks that are realized in cooperation with those. Thus, it is understood by those skilled in the art that these function blocks can be realized in a variety of forms by hardware only, software only or the combination thereof.

Figure 5:
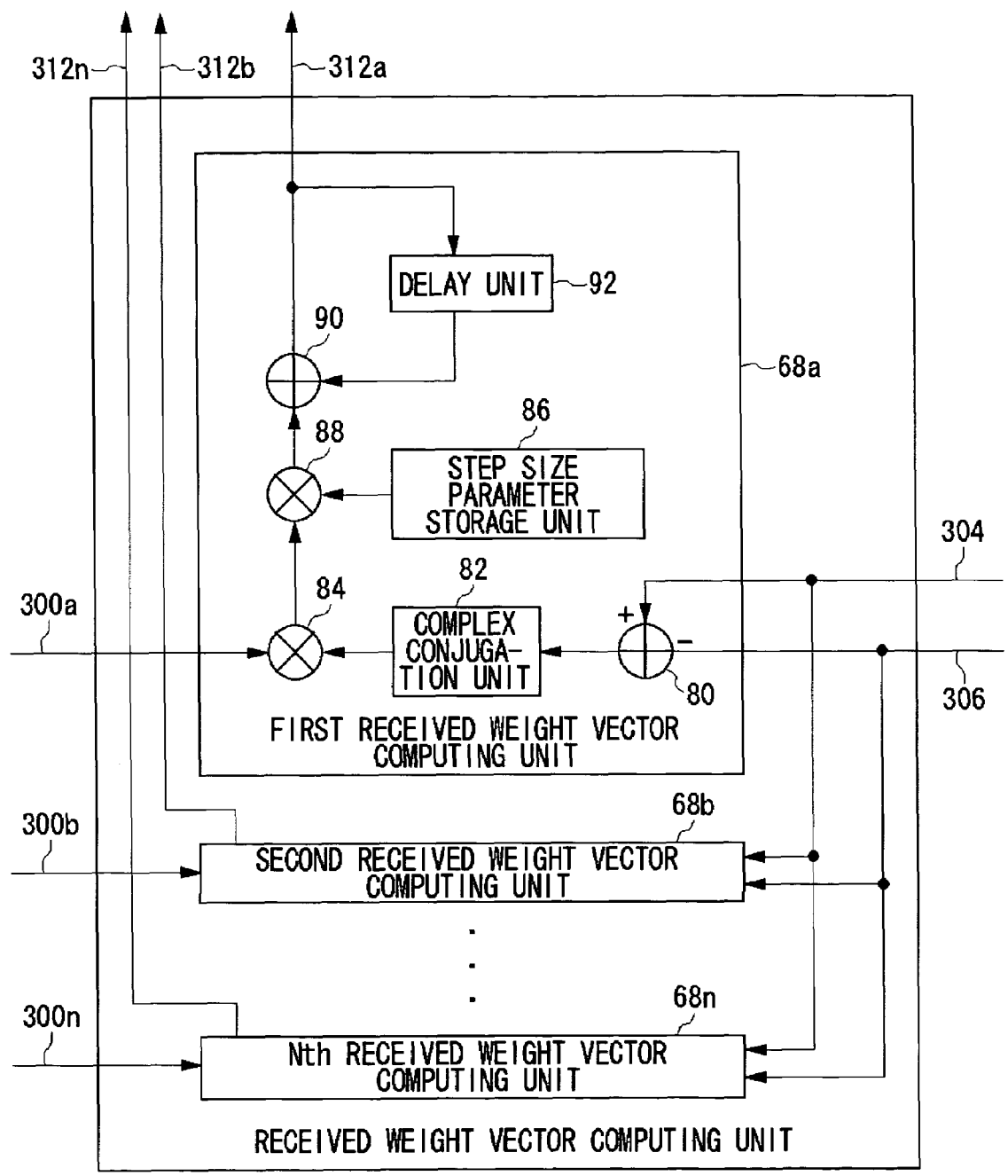
FIG. 5 shows a structure of the received weight vector computing unit shown in FIG. 4.

FIG. 5 shows a structure of the received weight vector computing unit 68. The received weight vector computing unit 68 includes a first received weight vector computing unit 68a, a second received weight vector computing unit 68b, ... and an Nth received weight vector computing unit 68n. The first received weight vector computing unit 68a includes an addition unit 80, a complex conjugation unit 82, a multiplication unit 84, a step-size parameter storage unit 86, a multiplication unit 88, an addition unit 90 and a delay unit 92.

The addition unit 80 computes the difference between the synthesized signal 304 and the reference signal 306, and outputs an error signal. This error signal is subjected to a complex conjugation conversion by the complex conjugation unit 82.

The multiplication unit 84 multiplies the error signal after the complex conjugation conversion by the first digital received signal 300a, and generates a first multiplication result.

The multiplication unit 88 multiplies the first multiplication result by a step-size parameter stored in the step-size parameter storage unit 86, and generates a multiplication second result. The second multiplication result is fed back by the delay unit 92 and the addition unit 90, and then added to a new second multiplication result. In this manner, the result of addition updated successively by the LMS algorithm is outputted as a first received weight vector 312a.

Figure 6:
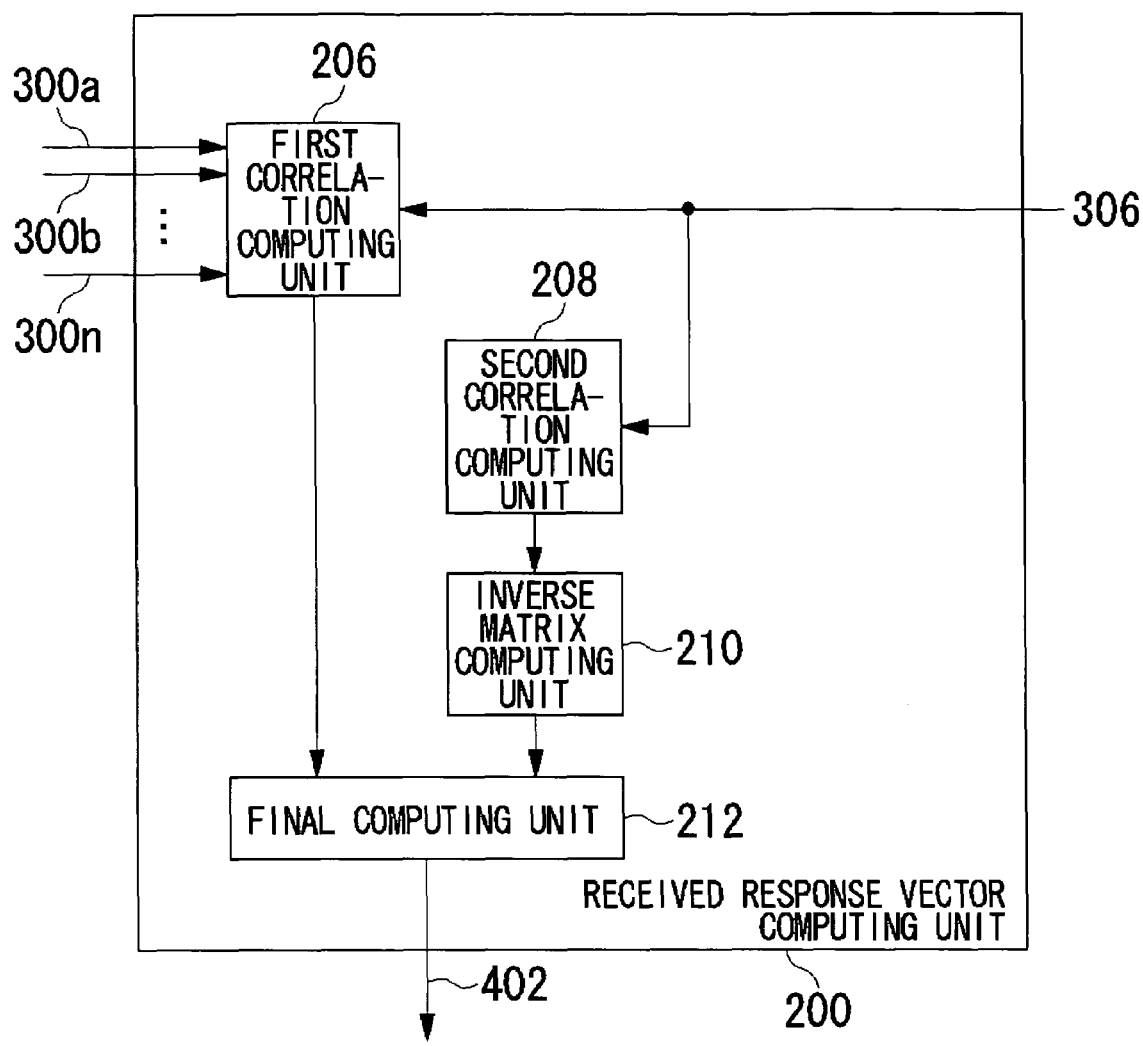
FIG. 6 shows a structure of the received response vector computing unit shown in FIG. 4.

FIG. 6 shows a structure of the received response vector computing unit 200. The received response vector computing unit 200 includes a first correlation computing unit 206, a second correlation computing unit 208, an inverse matrix computing unit 210 and a final computing unit 212.

The first correlation computing unit 206 computes a first correlation matrix between the digital received signal 300 and the reference signal 306. It is to be noted that the reference signal 306 may be inputted not only from within the signal processing unit 18 but also from a processing unit and the like (not shown) corresponding to other terminal apparatuses 10 via a signal line (not shown). For the sake of brevity, if the number of users of terminal apparatuses 10 is 2, then the reference signal corresponding to the first terminal apparatus 10 is designated as $S_1(t)$, and the reference signal corresponding to the second terminal apparatus 10 is designated as $S_2(t)$. Furthermore, if the number of basestation antennas 14 is 2, $x_1(t)$ of a first digital received signal 300a and $x_2(t)$ of a second digital received signal 300b are defined by the following equations (1):

$$x_1(t)=h_{11}S_1(t)+h_{21}S_2(t)$$

$$x_2(t)=h_{12}S_1(t)+h_{22}S_2(t) \quad (1)$$

where $h_{ij}$ is the response characteristic from an ith terminal apparatus 10 to a jth basestation antenna 14j, with noise ignored. A first correlation matrix $R_1$, with E as an ensemble average, is expressed by the following equation (2):

$$R_1 = \begin{bmatrix} E[x_1 S_1^*] & E[x_2 S_1^*] \\ E[x_1 S_2^*] & E[x_2 S_2^*] \end{bmatrix} \quad (2)$$

The second correlation computing unit 208 computes a second correlation matrix $R_2$, which is given by the following equation (3):

$$R_2 = \begin{bmatrix} E[S_1 S_1^*] & E[S_1^* S_2] \\ E[S_2 S_1^*] & E[S_2^* S_2] \end{bmatrix} \quad (3)$$

The inverse matrix computing unit 210 computes an inverse matrix of the second correlation matrix $R_2$.

The final computing unit 212 multiplies the inverse matrix of the second correlation matrix $R_2$ and the first correlation matrix $R_1$ together and outputs the received response vector 402, which is expressed by the following equation (4):

$$\begin{bmatrix} h_{11} & h_{12} \\ h_{21} & h_{22} \end{bmatrix} = R_1 R_2^{-1} \quad (4)$$

Figure 7:
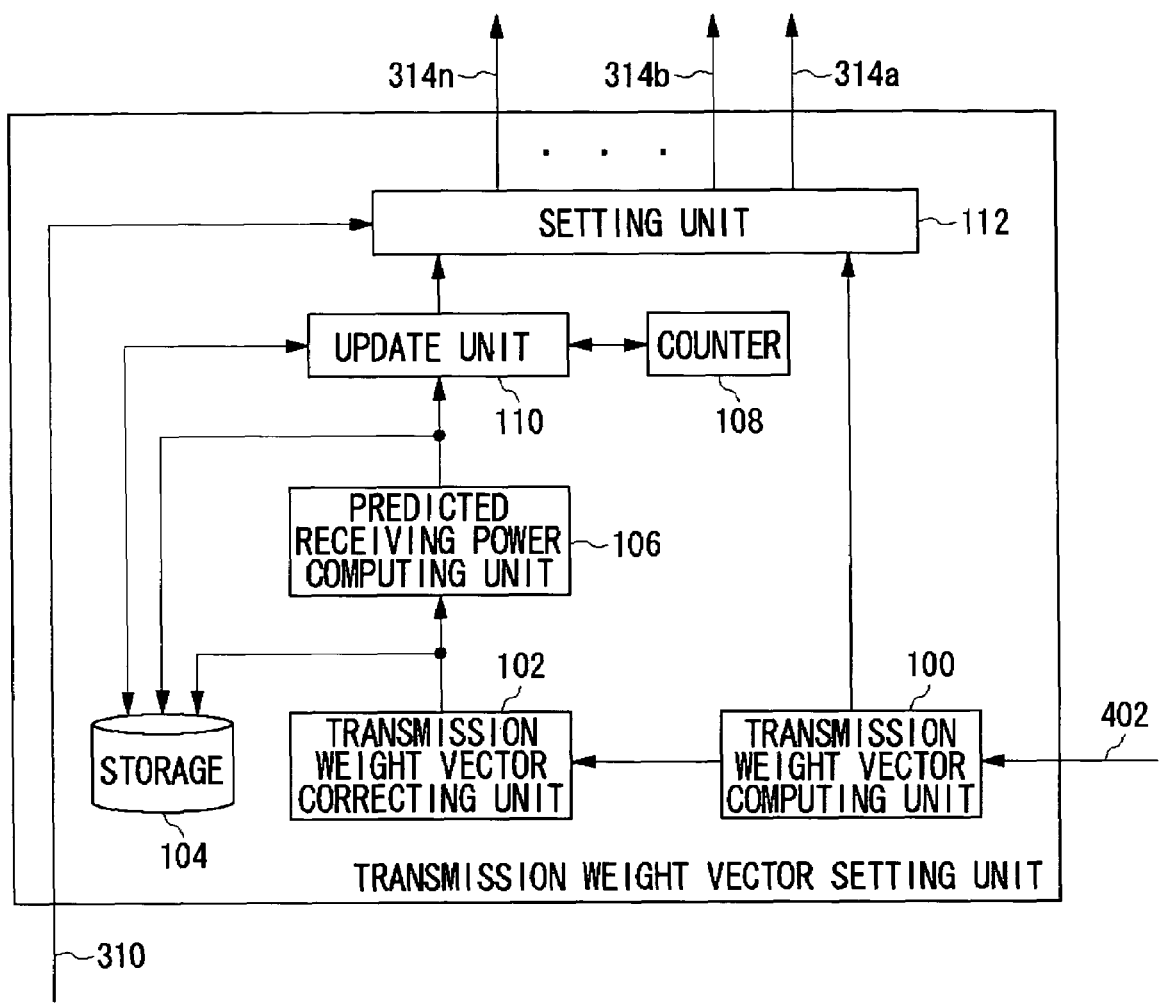
FIG. 7 shows a structure of the transmission weight vector setting unit shown in FIG. 4.

FIG. 7 shows a structure of the transmission weight vector setting unit 76. The transmission weight vector setting unit 76 includes a transmission weight vector computing unit 100, a transmission weight vector correcting unit 102, a storage 104, a predicted receiving power computing unit 106, a counter 108, an update unit 110 and a setting unit 112.

The transmission weight vector computing unit 100 computes weight vectors by an arbitrary method. As a most simple method therefor, however, the received weight vector 312 or the received response vector 402 may be used as it is. As another method, the received weight vector signal 312 or the received response vector 402 may be corrected using a conventional technique while the Doppler frequency variation of a propagation environment caused by time difference in between a receiving processing and a transmission processing is taken into account. Only one of the received weight vector signal 312 and the received response vector 402 may be used in deriving the transmission weight vector. Here, the received response vector 402 will be used.

In what is to follow, suppose that the received response vector 402 (denoted by H(t)) is expressed, for example, by $[h_1(t), h_2(t), h_3(t), h_4(t)]^T$ and the transmission weight vector W(t) which is computed by the transmission weight vector computing unit 100 is expressed by $[w_1(t), w_2(t), w_3(t), w_4(t)]^T$. Then, the transmission weight vector correcting unit 102 corrects the transmission weight vector W(t) so that the relationship of the received response vector 402 (H(t)) and the transmission weight vector W(t) becomes a constant C as in the following equation (5), so as to obtain a corrected transmission weight vector $W'(t)=[w_1'(t), w_2'(t), w_3'(t), w_4'(t)]^T$.

$$C=W(t)^*H(t) \quad (5)$$

Here, the range of correction for the transmission weight vector W is constrained to a predetermined range. And if it exceeds the predetermined range, a case where the relationship of the received response vector 402 (H(t)) and the corrected transmission weight vector W'(t) is no longer a constant shall be accepted.

The predicted receiving power computing unit 106 computes a predicted receiving power value Y(t) from the corrected transmission weight vector W'(t) and the received response vector 402 (H(t)), as indicated by the following equation (6).

$$Y(t)=W'(t)^*H(t) \quad (6)$$

The storage 104 stores the predicted receiving power values Y(t) and the corrected transmission weight vectors W'(t).

The update unit 110 calculates a difference between the computed predicted receiving power value Y(t) and the predicted receiving power value Y(t-T) in the past stored in storage 104. Then, if the difference is smaller than a predetermined threshold value, the corrected transmission weight vector W'(t) is selected whereas if the difference is larger than the predetermined threshold value, the past corrected transmission weight vector W'(t-xT) which has already been selected is selected, so as to be outputted to the setting unit 112. Here, x is the number of which the updating of the weight vector is stopped.

When the past corrected transmission weight vector W'(t-xT) is continuously selected in the update unit 110, the counter 108 increases the count value. When, on the other hand, the corrected transmission weight vector W'(t) is selected, the count value is reset. When the count value becomes larger than a predetermined value, an instruction to the effect that a corrected transmission weight vector W'(t) be selected is given to the update unit 110, and the count value is reset also.

If the modulation method is QPSK, the setting unit 112 selects the transmission weight vector W(t) outputted from the transmission weight vector computing unit 100, based on information on the modulation method contained in a signal processing unit control signal 310. If the modulation method is 16 QAM, the setting unit 112 selects the corrected transmission weight vector W'(t) or W'(t-xT) outputted from the update unit 110, and outputs it as a final transmission weight vector signal 314.

Figure 8A:
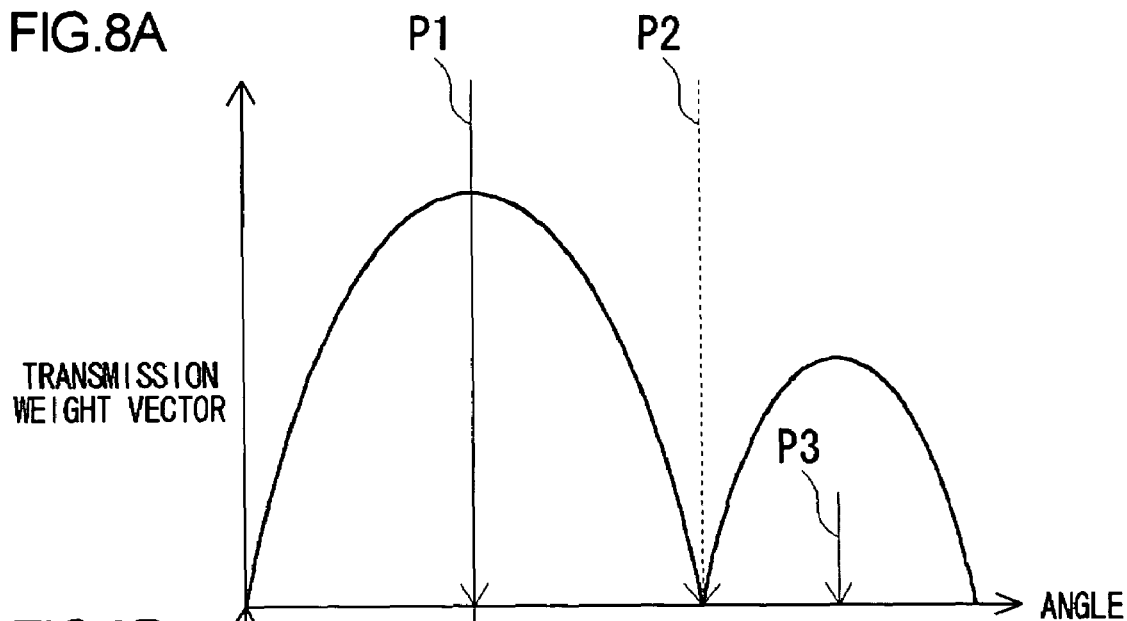
FIGS. 8A to 8C show the directivities by the antennas according to a conventional technology.
Figure 8B:
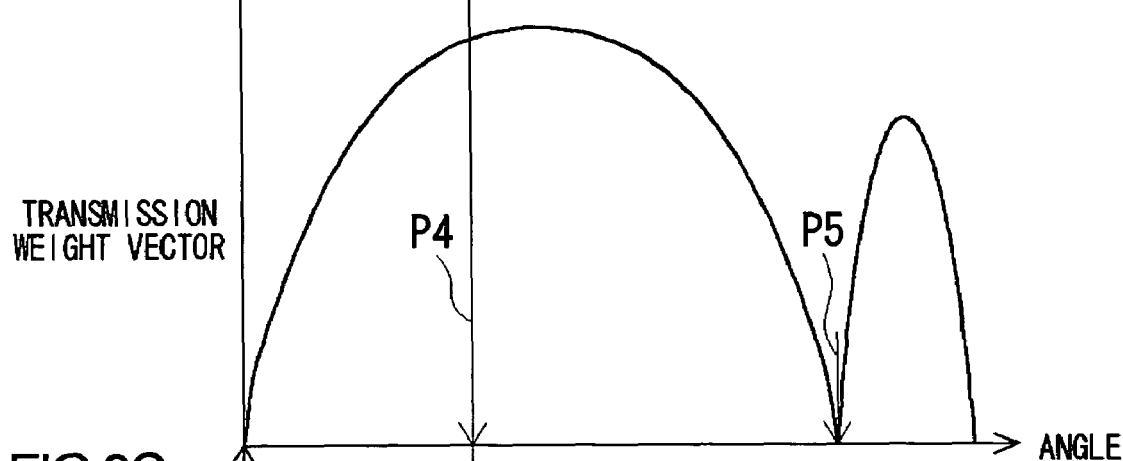
Figure 8C:
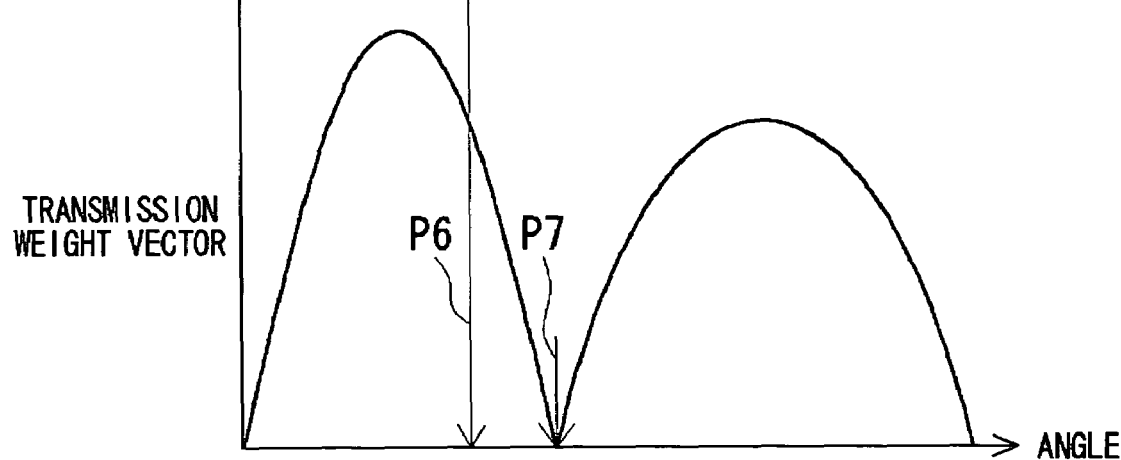

FIGS. 8A to 8C show the directivities by the antennas. They show gains with respect to the angles of transmission weight vectors. However, the transmission weight vectors shown here are not the ones according to the present embodiment but transmission weight vectors directly derived from the received response vectors according to a conventional technique. FIG. 8A shows a case when an interference wave, other than the desired wave, exists whereas FIGS. 8B and 8C are cases when the interference wave, other than the desired wave, does not exist. Referring to FIG. 8A, the desired wave is present at P1, the interference wave is present at P2 and the nose is present at P3. The gain becomes large at P1 where the gain becomes small at P2. Referring to FIG. 8B, the desired wave is present at P4 whereas the noise is present at P5. Referring to FIG. 8C, the desired wave is present at P6 whereas the noise is present at P7. The gains for the desired wave at P4 and P6 are varied greatly because the angles of noise between at P5 and P7 differ.

Figure 9:
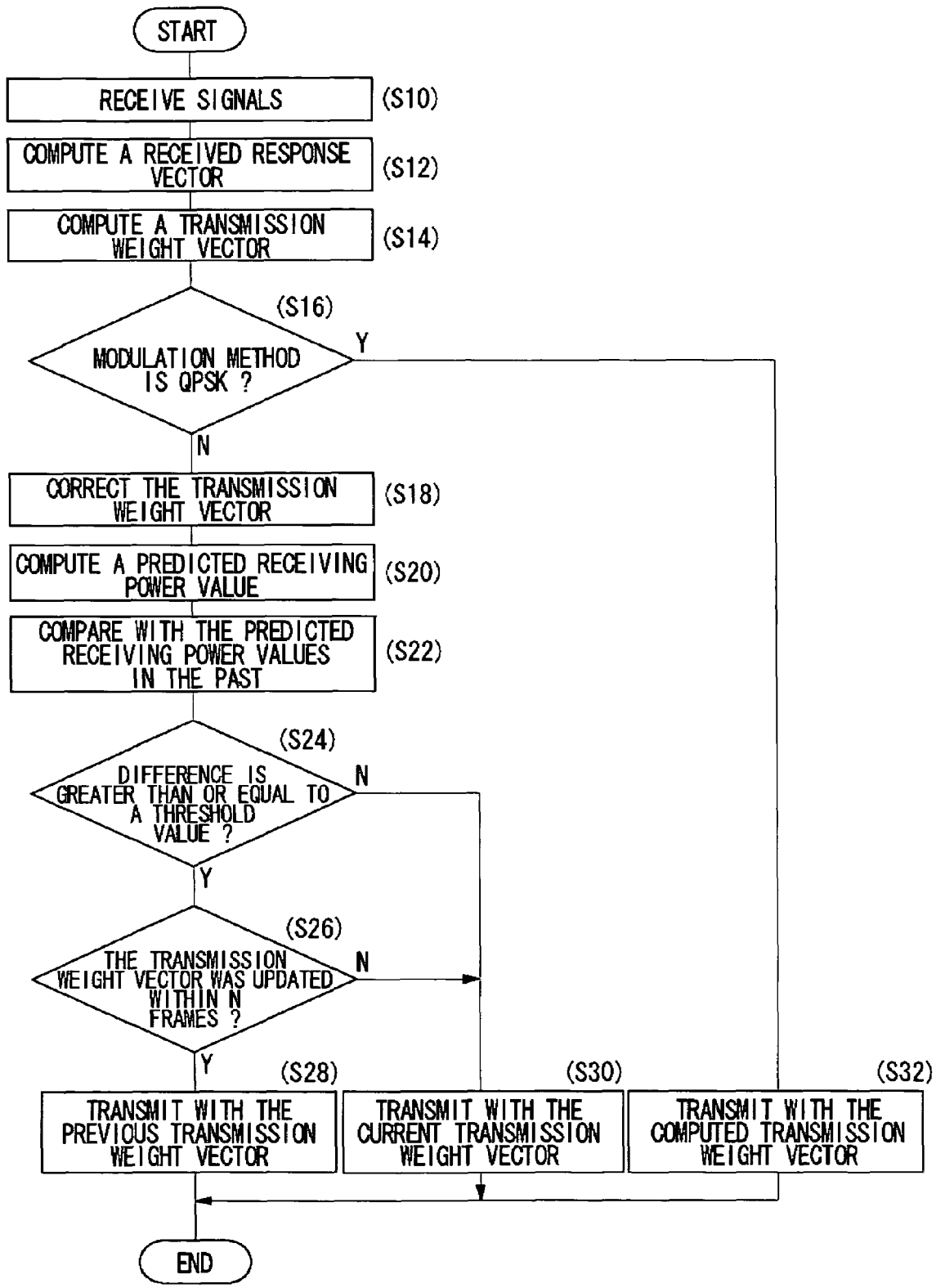
FIG. 9 is a flowchart showing a procedure for setting transmission weight vectors shown in FIG. 4.

FIG. 9 is a flowchart showing a procedure for setting transmission weight vectors. The base station apparatus 34 receives signals (S10). The received response vector computing unit 200 computes received response vectors 402 (S12). The transmission weight vector computing unit 100 computes transmission weight vectors from the received response vector 402 (S14). If QPSK is indicated by the information on the modulation method contained in the signal processing unit control signal 310 (Y of S16), the setting unit 112 selects the transmission weight vector as the final transmission weight vector signal 314, and the base station apparatus 34 transmits signals based on the final transmission weight vector signal 314 (S32). If, on the other hand, the modulation method is not QPSK (N of S16), the transmission weight vector correcting unit 102 corrects the transmission weight vector (S18), the predicted receiving power computing unit 106 computes a predicted receiving power value (S20), and the update unit 110 compares the computed predicted receiving power value with the predicted receiving power values computed in the past (S22).

If the difference is greater than or equal to a threshold value (Y of S24) and the corrected transmission weight vector is updated within N frames (Y of S26), then the setting unit 112 selects the previous corrected transmission weight vector as the final transmission weight vector signal 314, and the base station apparatus 34 transmits signals based on this final transmission weight vector signal 314 (S28). If, on the other hand, the difference is not greater than or equal to the threshold value (N of S24) or the corrected transmission weight vector is not updated within N frames (N of S26), then the setting unit 112 selects the most recent corrected transmission weight vector as the final transmission weight vector signal 314, and the base station apparatus 34 transmits signals based on this final transmission weight vector signal 314 (S30).

An operation of the base station apparatus 34 structured as above will be described hereinbelow. The received response vector 402 is computed from signals received by the received response vector computing unit 200. The transmission weight vector computing unit 100 derives transmission weight vectors from the received response vectors 402. The transmission weight vector correcting unit 102 corrects the transmission weight vectors, and the predicted receiving power computing unit 106 computes predicted receiving power values. When the difference between the computed predicted receiving power value and the predicted receiving power values in the past is greater than or equal to the threshold value, the update unit 110 selects the past corrected transmission weight vector. And when the modulation type is 16 QAM, the setting unit 112 regards the past corrected transmission weight vector as the final transmission weight vector signal 314. The separation unit 72 generates the digital transmission signals 302 from the final transmission weight vector signal 314 and the pre-separation signal 308 and transmits them.

According to the first embodiment, if information is contained in the amplitude components of signals to be transmitted, a received power value in a terminal apparatus which is a targeted party to the communication is predicted from the received response vector and the transmission weight vector, and the transmission weight vectors are corrected so that the predicted receiving power value remains nearly constant. As a result thereof, the variation in the received power value in the terminal apparatus can lie within a predetermined range. Furthermore, if the magnitude of the variation in the predicted receiving power value is large, the updating of transmission weight vectors is stopped and the signals are transmitted at a constant gain. As a result thereof, the unwanted large variation of received power in the terminal apparatus can be reduced. Furthermore, if the stoppage of updating the transmission weight vector continues for a period longer than a predetermined period, the transmission weight vector will be updated forcibly, so that updating the transmission weight vector can track the change in environment.

Second Embodiment

According to a second embodiment, similar to the first embodiment, either a corrected weight vector or a transmission weight vector is used, as a final transmission weight vector used in the transmission, by switching therebetween based on a predetermined criterion. In the first embodiment, the predetermined criterion is whether or not there exists information in an amplitude component. In the second embodiment, the predetermined criterion is the magnitude of variation in power of a received signal during a predetermined period. If the magnitude of variation in power of the received signal is small, computed transmission weight vectors are used as they are without being corrected, and the signals are transmitted.

Since the structure as shown in FIG. 1 is effective as a structure of a communication system 150 according to the second embodiment, the description of the communication system 150 is omitted here. In this second embodiment, newly added in a base station apparatus 34 is a measuring unit which measures varied values of received power.

Figure 10:
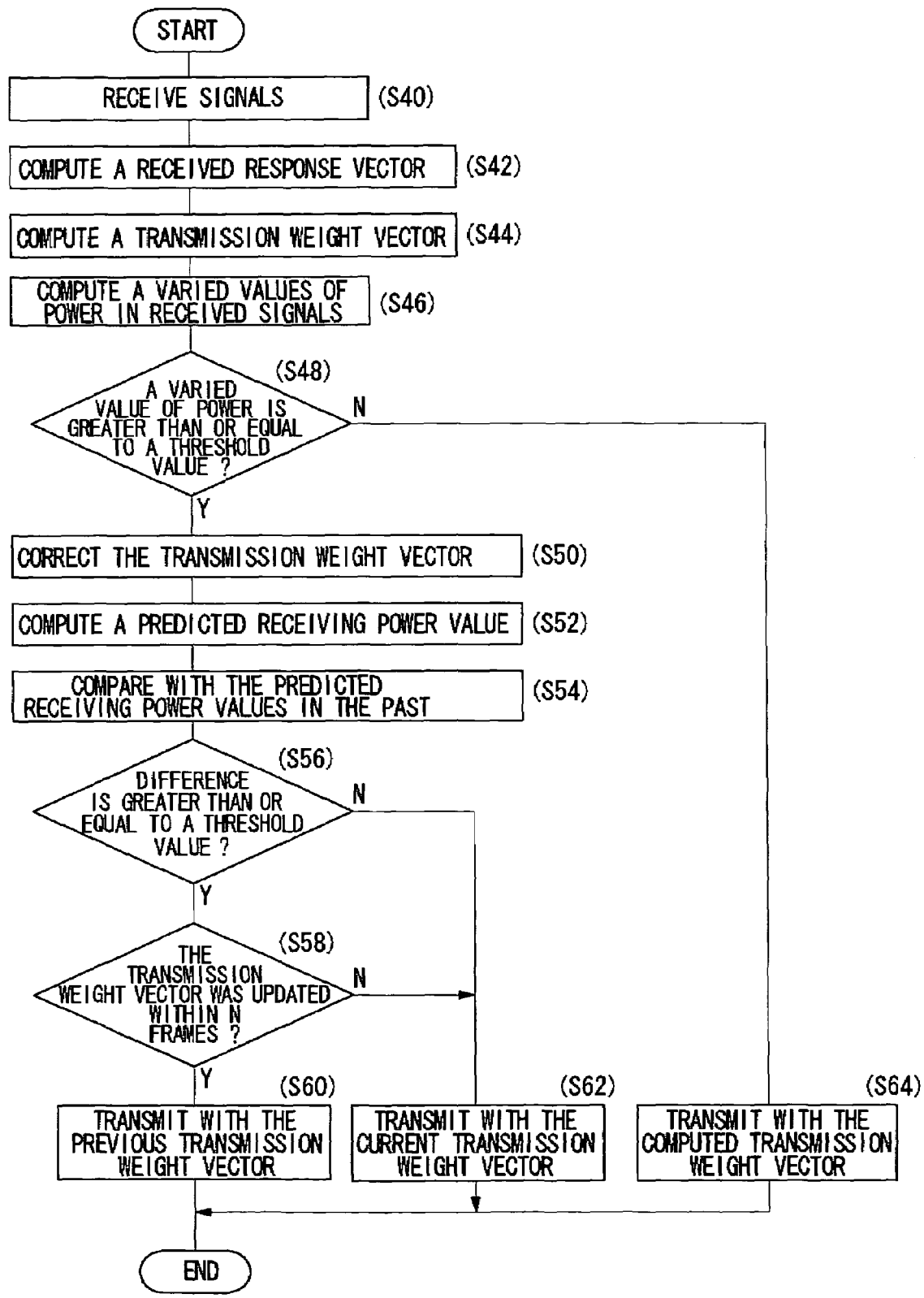
FIG. 10 is a flowchart showing a procedure for setting transmission weight vectors, according to a second embodiment of the present invention.

FIG. 10 is a flowchart showing a procedure for setting transmission weight vectors, according to the second embodiment. The base station apparatus 34 receives signals (S40). A received response vector computing unit 200 computes received response vectors 402 (S42). A transmission weight vector computing unit 100 computes transmission weight vectors from the received response vector 402 (S44). The measuring unit computes a varied value of power in a received signal (S46). If the varied value of power contained in the signal processing unit control signal 310 is not greater than or equal to a threshold value (N of S48), a setting unit 112 selects the transmission weight vector as a final transmission weight vector signal 314, and the base station apparatus 34 transmits signals based on this final transmission weight vector signal 314 (S64). If, on the other hand, the varied value of power is greater than or equal to the threshold value (Y of S48), a transmission weight vector correcting unit 102 corrects the transmission weight vector (S50), a predicted receiving power computing unit 106 computes a predicted receiving power value (S52), and an update unit 110 compares the computed predicted receiving power value with the predicted receiving power values computed in the past (S54).

If the difference is greater than or equal to a threshold value (Y of S56) and the corrected transmission weight vector is updated within N frames (Y of S58), then the setting unit 112 selects the previous corrected transmission weight vector as the final transmission weight vector signal 314, and the base station apparatus 34 transmits signals based on this final-transmission weight vector signal 314 (S60). If, on the other hand, the difference is not greater than or equal to the threshold value (N of S56) or the corrected transmission weight vector is not updated within N frames (N of S58), then the setting unit 112 selects the most recent corrected transmission weight vector, and the base station apparatus 34 transmits signals based on the thus selected final transmission weight vector signal 314 (S62).

An operation of the base station apparatus 34 structured according to the second embodiment will be described hereinbelow. The received response vector 402 is computed from signals received by the received response vector computing unit 200. The transmission weight vector computing unit 100 derives transmission weight vectors from the received response vectors 402. The transmission weight vector correcting unit 102 corrects the transmission weight vectors, and the predicted receiving power computing unit 106 computes predicted receiving power values. When the difference between the computed predicted receiving power value and the predicted receiving power value in the past is greater than or equal to the threshold value, the update unit 110 selects the past corrected transmission weight vector. And when the varied value of power in the received signal is greater than or equal to the threshold value, the setting unit 112 regards the past corrected transmission weight vector as the final transmission weight vector signal 314. A separation unit 72 generates the digital transmission signals 302 from the final transmission weight vector signal 314 and the pre-separation signal 308 and transmits them.

According to the second embodiment, if the magnitude of variation in power of the received signal is large, a received power value in a terminal apparatus which is a targeted party to the communication is predicted from the received response vector and the transmission weight vector, and the transmission weight vectors are corrected so that the predicted receiving power value remains nearly constant. As a result thereof, the range of the received power values in the terminal apparatus can lie within a predetermined range. Furthermore, if the magnitude of the variation in the predicted receiving power value is large, the updating of transmission weight vectors is stopped and the signals are transmitted at a constant gain. As a result thereof, the unwanted large variation of received power in the terminal apparatus can be reduced. Furthermore, if the stoppage of updating the transmission weight vector continues for a period longer than a predetermined period, the transmission weight vector will be updated forcibly, so that updating the transmission weight vector can track the change in environment.

Third Embodiment

According to a third embodiment, similar to the first embodiment, either a corrected weight vector or a transmission weight vector is used, as a final transmission weight vector used in the transmission, by switching therebetween based on a predetermined criterion. In the first embodiment, the predetermined criterion is whether or not there exists information in an amplitude component. In the third embodiment, the predetermined criterion involves a power ratio of a desired wave power to an interference wave power contained in a signal that has received a predetermined reference (hereinafter referred to as DU ratio) and a desired wave power value. That is, if either the DU ratio or the desired wave power value of the received signal is small, the transmission weight vectors are used as they are without being corrected and the signals are transmitted.

Since the structure as shown in FIG. 1 is effective as a structure of a communication system 150 according to the third embodiment, the description of the communication system 150 is omitted here. In this third embodiment, newly added in a base station apparatus 34 is a measuring unit which measures DU values and desired wave power values.

Figure 11:
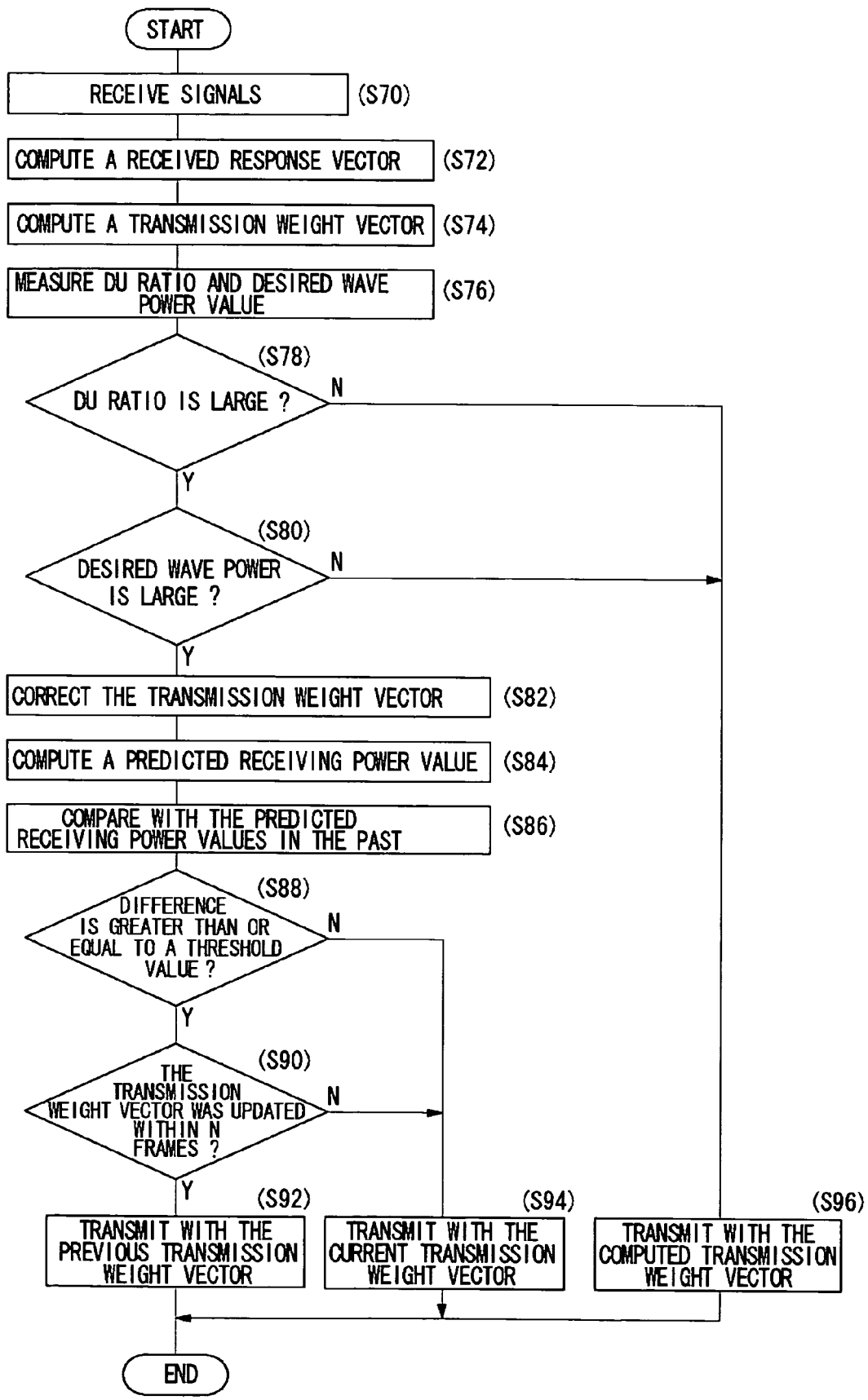
FIG. 11 is a flowchart showing a procedure for setting transmission weight vectors, according to a third embodiment of the present invention.

FIG. 11 is a flowchart showing a procedure for setting transmission weight vectors, according to the third embodiment. The base station apparatus 34 receives signals (S70). A received response vector computing unit 200 computes received response vectors 402 (S72). A transmission weight vector computing unit 100 computes transmission weight vectors from the received response vector 402 (S74). The measuring unit computes a DU ratio and a desired wave power value in a received signal (S76). If the DU ratio contained in the signal processing unit control signal 310 is not greater than a threshold value (N of S78) or the desired wave power value is not greater than or equal to a threshold value (N of S80), a setting unit 112 selects the transmission weight vector as a final transmission weight vector signal 314, and the base station apparatus 34 transmits signals based on this final transmission weight vector signal 314 (S96). If, on the other hand, the DU ratio is greater than the threshold value (Y of S78) and the desired wave power value is greater than or equal the threshold value (Y of S80), a transmission weight vector correcting unit 102 corrects the transmission weight vector (S82), a predicted receiving power computing unit 106 computes a predicted receiving power value (S84), and an update unit 110 compares the computed predicted receiving power value with the predicted receiving power values computed in the past (S86).

If the difference is greater than or equal to a threshold value (Y of S88) and the corrected transmission weight vector is updated within N frames (Y of S90), then the setting unit 112 selects the previous corrected transmission weight vector as the final transmission weight vector signal 314, and the base station apparatus 34 transmits signals based on this final transmission weight vector signal 314 (S92) If, on the other hand, the difference is not greater than or equal to the threshold value (N of S88) or the corrected transmission weight vector is not updated within N frames (N of S90), then the setting unit 112 selects the most recent corrected transmission weight vector, and the base station apparatus 34 transmits signals based on the thus selected final transmission weight vector signal 314 (S94).

An operation of the base station apparatus 34 structured according to the third embodiment will be described hereinbelow. The received response vector 402 is computed from signals received by the received response vector computing unit 200. The transmission weight vector computing unit 100 derives transmission weight vectors from the received response vectors 402. The transmission weight vector correcting unit 102 corrects the transmission weight vectors, and the predicted receiving power computing unit 106 computes predicted receiving power values. When the difference between the computed predicted receiving power value and the predicted receiving power value in the past is greater than or equal to the threshold value, the update unit 110 selects the past corrected transmission weight vector. And when the DU ratio and the desired wave power value are greater than or equal to the threshold values, the setting unit 112 regards the past corrected transmission weight vector as the final transmission weight vector signal 314. A separation unit 72 generates the digital transmission signals 302 from this final transmission weight vector signal 314 and the pre-separation signal 308 and transmits them.

According to the third embodiment, if the DU ratio of received signals is large and the desired wave power value is large, a received power value in a terminal apparatus which is a targeted party to the communication is predicted from the received response vector and the transmission weight vector, and the transmission weight vectors are corrected so that the predicted receiving power value remains nearly constant. As a result thereof, the range of the received power values in the terminal apparatus can lie within a predetermined range. Furthermore, if the magnitude of the variation in the predicted receiving power value is large, the updating of transmission weight vectors is stopped and the signals are transmitted at a constant gain. As a result thereof, the unwanted large variation of received power in the terminal apparatus can be reduced. Furthermore, if the stoppage of updating the transmission weight vector continues for a period longer than a predetermined period, the transmission weight vector will be updated forcibly, so that updating the transmission weight vector can track the change in environment.

Fourth Embodiment

In the third embodiment, as the final transmission weight vector to be used for the transmission, the corrected transmission weight vector is selected if both the DU ratio and the desired wave power value of the received signal are large whereas the transmission weight vector is selected if either the DU ratio or the desired wave power value of the received signal is small. According to a fourth embodiment, in order to further simplify the structure of apparatus, the transmission weight vector is used as the final transmission weight vector if either the DU ratio or the desired wave power value of the received signal is small, and the adaptive array antenna processing is not performed and, instead, a single antenna only is used for transmission if both the DU ratio and the desired wave power value of the received signal are large.

Since the structure as shown in FIG. 1 is also effective as a structure of a communication system 150 according to the fourth embodiment, the description of the communication system 150 is omitted here.

Figure 12:
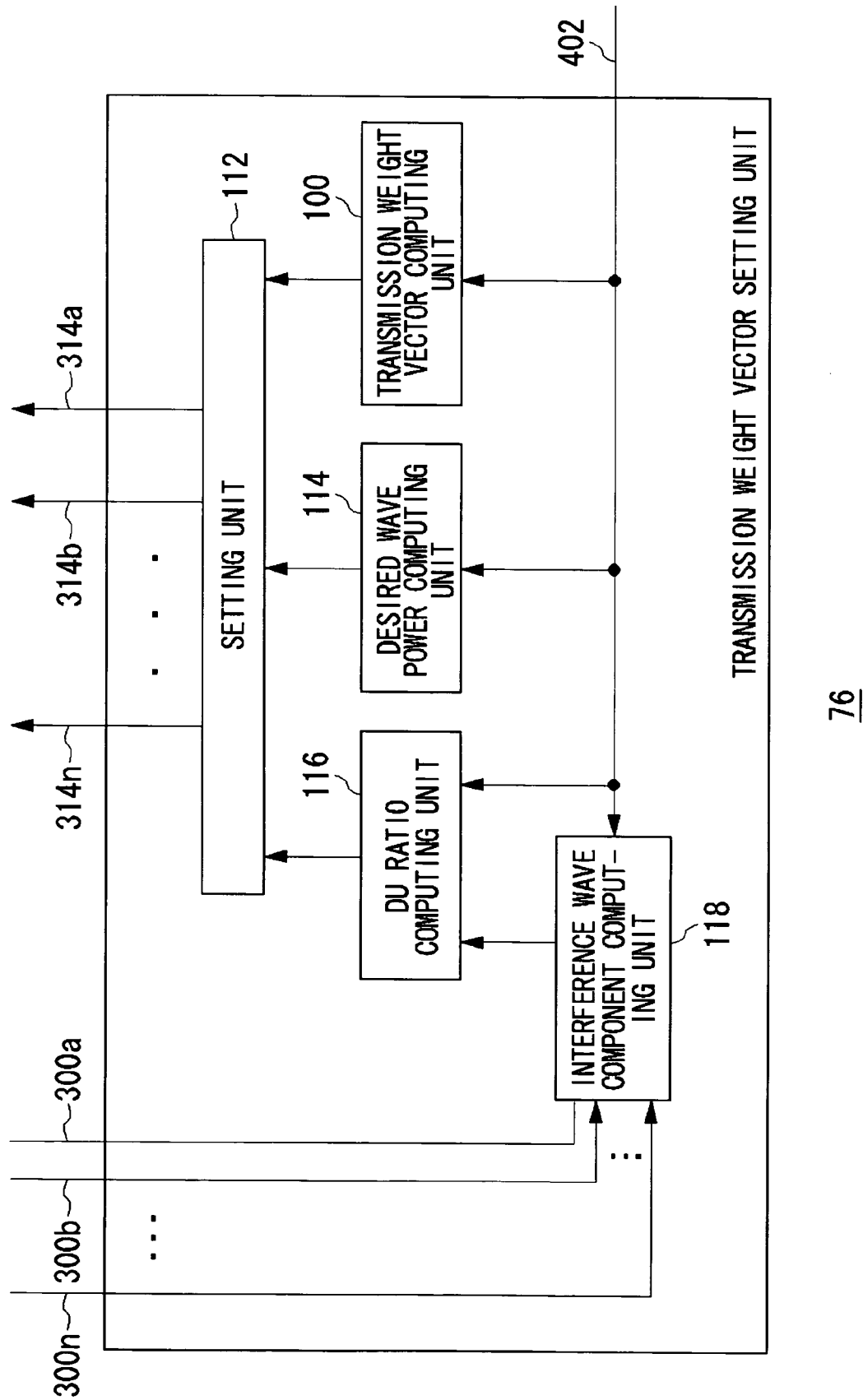
FIG. 12 shows a structure of a transmission weight vector setting unit according to a fourth embodiment of the present invention.

FIG. 12 shows a structure of a transmission weight vector setting unit 76 according to the fourth embodiment. The transmission weight vector setting unit 76 includes a transmission weight vector computing unit 100, a desired wave power computing unit 114, a DU ratio computing unit 116, an interference wave component computing unit 118 and a setting unit 112.

The desired wave power computing unit 114 computes a desired wave power value from the received response vector 402. The computing method used therefor may be arbitrary. For example, each component of the received response vector 402 is summed up.

The interference wave component computing unit 118 computes a power value of an interference wave component from the digital received signal 300, according to a desired wave component contained in the received response vector 402.

The DU ratio computing unit 116 computes a DU ratio from a desired wave component contained in the received response vector 402 and the power value of an interference wave component computed by the interference wave component computing unit 118.

According to the DU ratio from the DU ratio computing unit 116 and a predetermined desired wave power value from the desired wave power computing unit 114, the setting unit 112 selects, as the final transmission weight vector signal 314, either the transmission weight vector from the transmission weight vector computing unit 100 or a value for which only a single component of the final weight vector signal 314 is validated. The latter corresponds to the communication by a single omni-antenna.

FIG. 13 is a flowchart showing a procedure for setting transmission weight vectors, according to the fourth embodiment. The base station apparatus 34 receives signals (S100). A received response vector computing unit 200 computes received response vectors 402 (S102). A transmission weight vector computing unit 100 computes transmission weight vectors from the received response vector 402 (S104). The DU ratio computing unit 116 measures the DU ratio of a received signal, and the desired wave power computing unit 114 measures the power value of a desired wave (S106). If the DU ratio is not greater than a threshold value (N of S108) or the desired wave power value is not greater than or equal to a threshold value (N of S110), a setting unit 112 selects the transmission weight vector as a final transmission weight vector signal 314, and the base station apparatus 34 transmits signals based on this final transmission weight vector signal 314 (S114). If, on the other hand, the DU ratio is greater than the threshold value (Y of S108) and the desired wave power value is greater than or equal the threshold value (Y of S110), the setting unit 112 selects a single antenna only and the signals are omnitransmitted by the single antenna (S112).

An operation of the base station apparatus 34 structured according to the fourth embodiment will be described hereinbelow. The received response vector 402 is computed from signals received by the received response vector computing unit 200. The transmission weight vector computing unit 100 derives transmission weight vectors from the received response vectors 402. The desired wave power computing unit 114 computes desired wave power values and the DU ratio computing unit 116 computes DU ratios. And when the desired wave power value and the DU ratio are greater than or equal to the threshold values, the setting unit 112 determines the final transmission weight vector signal 314 for which only the final transmission weight vector signal 314 corresponding to a single antenna is validated. A separation unit 72 generates the digital transmission signals 302 from this final transmission weight vector signal 314 and the pre-separation signal 308, and transmits them.

According to the fourth embodiment, the adaptive array antenna is switched to the single omni-antenna when the DU ratio of the received signal is large and the desired wave power value thereof is large. Thus, a simple processing can be realized while the transmission power is kept constant.

The present invention has been described based on the embodiments which are only exemplary. It is understood by those skilled in the art that there exist other various modifications to the combination of each component and processing step described above and that such modifications are encompassed by the scope of the present invention.

In the first to third embodiments, after the update unit 112 selects the corrected transmission weight vector, the setting unit 112 determines the final transmission weight vector signal 314 based on the signal processing unit control signal 310. However, it is not limited thereto and, for example, the update unit 110 may select the corrected transmission weight vector after the setting unit 112 acquires information through the signal processing unit control signal 310. In this modified example, the provision of the transmission weight vector correcting unit 102, the predicted receiving power computing unit 106 and the update unit 110 is not required at all if the transmission weight vector computed by the transmission weight vector computing unit 100 is taken as the final transmission weight vector signal 314. That is, it suffices that a specified value is outputted from the final transmission weight vector signal 314.

In the first embodiment, the modem unit 20 changes the modulation method in order to change the data transmission rate. However, the data transmission rate may be changed using a factor other than modulation method. For example, the coding rate for error correction may be varied. In this modified example, by combining the modulation method and the coding rate, the data transmission rate can be regulated in a further detailed and precise manner. That is, it is acceptable if the data transmission rate takes a plurality of values.

In the first to fourth embodiments, the received weight vector computing unit 68 uses adaptive algorithms to estimate received weight vectors 312, and the received response vector computing unit 200 uses a correlation processing to estimate the received response vector 402. However, a processing different therefrom may be performed at the received weight vector computing unit 68 and the received response vector computing unit 200. For example, only one of the adaptive algorithm and the correlation processing may be carried out at the received weight vector computing unit 68 and the received response vector computing unit 200. In such a case, the received weight vector computing unit 68 and the received response vector computing unit 200 may be integrally structured. Moreover, arrival direction estimation using algorithms, such as MUSIC (MUltiple Signal Classification), different from the adaptive algorithm or correlation processing may be carried out at the received weight vector computing unit 68 or the received response vector computing unit 200. In this modification, the desired waves and undesired waves are distinguished and identified as such with greater accuracy. That is, the modified examples may be acceptable as long as they can estimate values by which a plurality of received signals can be separated in the signal processing with an adaptive array antenna.

Although the present invention has been described by way of exemplary embodiments, it should be understood that many changes and substitutions may further be made by those skilled in the art without departing from the scope of the present invention which is defined by the appended claims.

What is claimed is:

1. A radio apparatus, including:
   a receiver which receives signals from a predetermined terminal apparatus;
   a received response characteristics computing unit which calculates, from the signals received by said receiver, a received response characteristic for the terminal apparatus;
   a transmission weight factor computing unit which computes, from the signals received by said receiver, a candidate of transmission weight factor for the terminal apparatus;
   a predicted power computing unit which computes, from the candidate of transmission weight factor and the received response characteristic, a predicted receiving power value in the terminal apparatus;
   a storage which stores the predicted receiving power value computed by said predicted power computing unit;
   a setting unit which updates and sets the transmission weight factor to the candidate of transmission weight factor computed by said transmission weight factor computing unit if a difference between a predicted receiving power value in the past stored in said storage and the predicted receiving power value computed by said predicted power computing unit is less than a predetermined threshold value and which sets without updating the transmission weight factor if the difference thereof is greater than or equal to the predetermined threshold value; and
   a transmitter which transmits signals to the terminal apparatus based on the transmission weight factor set by said setting unit.

2. A radio apparatus according to claim 1, wherein, if the transmission weight factor is set, without having been updated, for longer than a predetermined period of time, said setting unit updates the transmission weight factor irrespective of the difference between the predicted receiving power value in the past stored in said storage and the thus computed predicted receiving power value.

3. A radio apparatus, including:
   a receiver which receives signals from a predetermined terminal apparatus;
   a received response characteristics computing unit which calculates, from the signals received by said receiver, a received response characteristic for the terminal apparatus;
   a transmission weight factor computing unit which computes, from the signals received by said receiver, a candidate of transmission weight factor for the terminal apparatus;
   a correction unit which corrects the candidate of transmission weight factor in a manner such that a relationship between the candidate of transmission weight factor and the received response characteristic comes close to a predetermined value in a prescribed range of values;
   a predicted power computing unit which computes, from the corrected candidate of transmission weight factor and the received response characteristic, a predicted receiving power value in the terminal apparatus;

a storage which stores the predicted receiving power value computed by said predicted power computing unit;

a setting unit which updates and sets the transmission weight factor with the corrected candidate of transmission weight factor computed by said transmission weight factor computing unit if a difference between a predicted receiving power value in the past stored in said storage and the predicted receiving power value computed by said predicted power computing unit is less than a predetermined threshold value and which sets without updating the transmission weight factor if the difference thereof is greater than or equal to the predetermined threshold value; and a transmitter which transmits signals to the terminal apparatus based on the transmission weight factor set by said setting unit.

4. A radio apparatus according to claim 3, wherein, if the transmission weight factor is set, without having been updated, for longer than a predetermined period of time, said setting unit updates the transmission weight factor irrespective of the difference between the predicted receiving power value in the past stored in said storage and the thus computed predicted receiving power value.

5. A radio apparatus, including:

a receiver which receives signals from a predetermined terminal apparatus;

a received response characteristics computing unit which calculates, from the signals received by said receiver, a received response characteristic for the terminal apparatus;

a transmission weight factor computing unit which computes, from the signals received by said receiver, a first candidate of transmission weight factor for the terminal apparatus;

a correction unit which corrects the first candidate of transmission weight factor in a manner such that a relationship between the first candidate of transmission weight factor and the received response characteristic comes close to a predetermined value in a prescribed range of values;

a predicted power computing unit which computes, from the corrected first candidate of transmission weight factor and the received response characteristic, a predicted receiving power value in the terminal apparatus;

a storage which stores the predicted receiving power value computed by said predicted power computing unit;

a setting unit which sets the transmission weight factor to the corrected first candidate of transmission weight factor by updating a second candidate of transmission weight factor if a difference between a predicted receiving power value in the past stored in said storage and the predicted receiving power value computed by said predicted power computing unit is less than a predetermined threshold value and which sets without updating the second candidate of transmission weight factor if the difference thereof is greater than or equal to the predetermined threshold value;

an information input unit which inputs information to signals to be transmitted;

a setting unit which sets, based on the information inputted to signals to be transmitted, either the first candidate of transmission weight factor or the second candidate of transmission weight factor as a transmission weight factor; and a transmitter which transmits signals to the terminal apparatus based on the transmission weight factor set by said setting unit.

6. A radio apparatus according to claim 5, wherein, if the transmission weight factor is set, without the second candidate of transmission weight factor having been updated, for longer than a predetermined period of time, said setting unit sets by updating the second candidate of transmission weight factor irrespective of the difference between the predicted receiving power value in the past stored in said storage and the thus computed predicted receiving power value.

7. A radio apparatus according to claim 5, wherein as the information inputted to signals to be transmitted said information input unit inputs information indicative of whether or not predetermined information is contained in an amplitude component of a signal to be transmitted, and wherein said setting unit sets the first candidate of transmission weight factor as the transmission weight factor if the predetermined information is not contained in the amplitude component of a signal to be transmitted, whereas said setting unit sets the second candidate of transmission weight factor as the transmission weight factor if the predetermined information is contained in the amplitude component of the signal to be transmitted.

8. A radio apparatus according to claim 5, further including a measuring unit which measures the magnitude of variation in power of the received signals during a predetermined period, wherein as the information inputted to signals to be transmitted said information input unit inputs the magnitude of variation in power, and wherein said setting unit sets the first candidate of transmission weight factor as the transmission weight factor if the magnitude of variation in power is less than a predetermined threshold value, whereas said setting unit sets the second candidate of transmission weight factor as the transmission weight factor if the magnitude of variation in power is greater than or equal to the predetermined threshold value.

9. A radio apparatus according to claim 5, further including a measuring unit which measures a power value of the received signal, wherein as the information inputted to signals to be transmitted said information input unit inputs the power value, and wherein said setting unit sets the first candidate of transmission weight factor as the transmission weight factor if the power value is less than a predetermined threshold value, whereas said setting unit sets the second candidate of transmission weight factor as the transmission weight factor if the power value is greater than or equal to the predetermined threshold value.

10. A radio apparatus according to claim 5, further including a measuring unit which measures a power ratio of a power value of the signal received from the terminal apparatus to that of signals received from other terminal apparatus, wherein as the information inputted to signals to be transmitted said information input unit inputs the power ratio, and wherein said setting unit sets the first candidate of transmission weight factor as the transmission weight factor if the power ratio is less than a predetermined threshold value, whereas said setting unit sets the second candidate of transmission weight factor as the transmission weight factor if the power ratio is greater than or equal to the predetermined threshold value.

11. A radio apparatus, including:
a receiver which receives signals from a terminal apparatus via a plurality of antennas;
a measuring unit which measures the magnitude of variation in power of the received signals;
a transmission weight factor computing unit which computes, from the received signals, a transmission weight factor for the terminal apparatus; and
a transmitter which transmits signals, based on the updated transmission weight factor computed by said transmission weight factor computing unit, via the plurality of antennas if the magnitude of variation in power measured by said measuring unit is less than a predetermined threshold value and which transmits signals via one of the plurality of antennas without updating the transmission weight factor if the magnitude of variation in power measured by said measuring unit is greater than or equal to a predetermined threshold value.

12. A transmission method, including:
receiving signals from a predetermined terminal apparatus;
calculating from the received signals a received response characteristic for the terminal apparatus;
computing from the received signals a candidate of transmission weight factor for the terminal apparatus;
computing, from the candidate of transmission weight factor and the received response characteristic, a predicted receiving power value in the terminal apparatus;
storing the computed predicted receiving power value in a storage;
setting by updating the transmission weight factor with the computed candidate of transmission weight factor if a difference between a predicted receiving power value in the past stored in the storage and the predicted receiving power value computed by said computing a predicted receiving power value is less than a predetermined threshold value, and setting without updating the transmission weight factor if the difference thereof is greater than or equal to the predetermined threshold value; and
transmitting signals to the terminal apparatus based on the transmission weight factor set by said setting.

13. A transmission method according to claim 12, wherein, if the transmission weight factor is set, without having been updated, for longer than a predetermined period of time, said setting is such that the transmission weight factor is updated irrespective of the difference between the predicted receiving power value in the past stored in the storage and the thus computed predicted receiving power value.

14. A transmission method, including:
receiving signals from a predetermined terminal apparatus;
calculating from the received signals a received response characteristic for the terminal apparatus;
computing from the received signals a candidate of transmission weight factor for the terminal apparatus;
correcting the candidate of transmission weight factor in a manner such that a relationship between the candidate of transmission weight factor and the received response characteristic comes close to a predetermined value in a prescribed range of values;
computing, from the corrected candidate of transmission weight factor and the received response characteristic, a predicted receiving power value in the terminal apparatus;
storing the computed predicted receiving power value in a storage;
setting by updating the transmission weight factor with the corrected candidate of transmission weight factor if a difference between a predicted receiving power value in the past stored in the storage and the predicted receiving power value computed by said computing a predicted receiving power value is less than a predetermined threshold value, and setting without updating the transmission weight factor if the difference thereof is greater than or equal to the predetermined threshold value; and
transmitting signals to the terminal apparatus based on the transmission weight factor set by said setting.

15. A transmission method according to claim 14, wherein, if the transmission weight factor is set, without having been updated, for longer than a predetermined period of time, said setting is such that the transmission weight factor is updated irrespective of the difference between the predicted receiving power value in the past stored in the storage and the thus computed predicted receiving power value.

16. A transmission method, including:
receiving signals from a predetermined terminal apparatus;
calculating from the received signals a received response characteristic for the terminal apparatus;
computing from the received signals a first candidate of transmission weight factor for the terminal apparatus;
correcting the first candidate of transmission weight factor in a manner such that a relationship between the first candidate of transmission weight factor and the received response characteristic comes close to a predetermined value in a prescribed range of values;
computing, from the corrected first candidate of transmission weight factor and the received response characteristic, a predicted receiving power value in the terminal apparatus;
storing the computed predicted receiving power value in a storage;
setting by updating a second candidate of transmission weight factor with the corrected first candidate of transmission weight factor by the second candidate of transmission weight factor if a difference between a predicted receiving power value in the past stored in the storage and the predicted receiving power value computed by said computing predicted receiving power value is less than a predetermined threshold value, and setting without updating the second candidate of transmission weight factor if the difference thereof is greater than or equal to the predetermined threshold value;
inputting information to signals to be transmitted;
setting, based on the information inputted signals to be transmitted, either the first candidate of transmission weight factor or the second candidate of transmission weight factor as a transmission weight factor; and
transmitting signals to the terminal apparatus based on the transmission weight factor set by said setting.

17. A transmission method according to claim 16, wherein, if the transmission weight factor is set, without the second candidate of transmission weight factor having been updated, for longer than a predetermined period of time, said setting by or without updating is such that said setting is done by updating the second candidate of transmission weight factor irrespective of the difference between the predicted receiving power value in the past stored in the storage and the thus computed predicted receiving power value.

18. A transmission method according to claim 16, wherein as the information inputted to signals to be transmitted said inputting inputs information indicative of whether or not predetermined information is contained in an amplitude component of a signal to be transmitted, and wherein said setting sets the first candidate of transmission weight factor as the transmission weight factor if the predetermined information is not contained in the amplitude component of the signal to be transmitted, whereas said setting sets the second candidate of transmission weight factor as the transmission weight factor if the predetermined information is contained in the amplitude component of a signal to be transmitted.

19. A transmission method according to claim 16, further including measuring the magnitude of variation in power of the received signals during a predetermined period,
   wherein as the information inputted to signals to be transmitted said inputting information inputs the magnitude of variation in power, and
   wherein said setting sets the first candidate of transmission weight factor as the transmission weight factor if the magnitude of variation in power is less than a predetermined threshold value, whereas said setting sets the second candidate of transmission weight factor as the transmission weight factor if the magnitude of variation in power is greater than or equal to the predetermined threshold value.

20. A transmission method according to claim 16, further including measuring a power value of the received signal,
   wherein as the information inputted to signals to be transmitted said inputting information inputs the power value, and
   wherein said setting sets the first candidate of transmission weight factor as the transmission weight factor if the power value is less than a predetermined threshold value, whereas said setting sets the second candidate of transmission weight factor as the transmission weight factor if the power value is greater than or equal to the predetermined threshold value.

21. A transmission method according to claim 16, further including measuring a power ratio of a power value of the signal received from the terminal apparatus to that of signals received from other terminal apparatus,
   wherein as the information inputted to signals to be transmitted said inputting information inputs the power ratio, and
   wherein said setting sets the first candidate of transmission weight factor as the transmission weight factor if the power ratio is less than a predetermined threshold value, whereas said setting sets the second candidate of transmission weight factor as the transmission weight factor if the power ratio is greater than or equal to the predetermined threshold value.

22. A transmission method, including:
   receiving signals from a terminal apparatus via a plurality of antennas;
   measuring the magnitude of variation in power of the received signals;
   computing from the received signals a transmission weight factor for the terminal apparatus; and
   transmitting signals, based on the updated transmission weight factor computed by said computing, via the plurality of antennas if the magnitude of variation in power measured by said measuring is less than a predetermined threshold value, and transmitting signals via one of the plurality of antennas without updating the transmission weight factor if the magnitude of variation in power measured by said measuring is greater than or equal to the predetermined threshold value.

23. A program in a storage medium executable by a computer, the program including the functions of:
   receiving signals in a memory from a predetermined terminal apparatus;
   calculating, from the signals received in the memory, a received response characteristic for the terminal apparatus;
   computing, from the signals received in a memory, a candidate of transmission weight factor for the terminal apparatus;
   computing, from the candidate of transmission weight factor and the received response characteristic, a predicted receiving power value in the terminal apparatus;
   storing the computed predicted receiving power value in a recording device;
   setting by updating a memory of the transmission weight factor with the computed candidate of transmission weight factor if a difference between a predicted receiving power value in the past stored in the recording device and the predicted receiving power value computed by said computing a predicted receiving power value is less than a predetermined threshold value, and setting without updating the memory of the transmission weight factor if the difference thereof is greater than or equal to the predetermined threshold value; and
   transmitting signals to the terminal apparatus based on the memory of the transmission weight factor set by said setting.

24. A program according to claim 23, wherein, if the transmission weight factor is set, without having been updated, for longer than a predetermined period of time, the setting is such that the transmission weight factor is updated irrespective of the difference between the predicted receiving power value in the past stored in the storage and the thus computed predicted receiving power value.

25. A program in a storage medium executable by a computer, the program including the functions of:
   receiving signals in a memory from a predetermined terminal apparatus;
   calculating, from the signals received in the memory, a received response characteristic for the terminal apparatus;
   computing, from the signals received in the memory, a candidate of transmission weight factor for the terminal apparatus;
   correcting the candidate of transmission weight factor in a manner such that a relationship between the candidate of transmission weight factor and the received response characteristic comes close to a predetermined value in a prescribed range of values;
   computing, from the corrected candidate of transmission weight factor and the received response characteristic, a predicted receiving power value in the terminal apparatus;
   storing the computed predicted receiving power value in a storage;
   setting by updating a memory of the transmission weight factor with the corrected candidate of transmission weight factor if a difference between a predicted receiving power value in the past stored in the storage and the predicted receiving power value computed by said computing a predicted receiving power value is less than a predetermined threshold value, and setting without updating the memory of the transmission weight factor if the difference thereof is greater than or equal to the predetermined threshold value; and transmitting signals to the terminal apparatus based on the memory of the transmission weight factor set by said setting.

26. A program according to claim 25, wherein, if the transmission weight factor is set, without having been updated, for longer than a predetermined period of time, the setting is such that the transmission weight factor is updated irrespective of the difference between the predicted receiving power value in the past stored in the storage and the thus computed predicted receiving power value.

27. A program in a storage medium executable by a computer, the program including the functions of:

receiving signals in a memory from a predetermined terminal apparatus;

calculating, from the signals received in the memory, a received response characteristic for the terminal apparatus;

computing, from the signals received in the memory, a first candidate of transmission weight factor for the terminal apparatus;

correcting the first candidate of transmission weight factor in a manner such that a relationship between the first candidate of transmission weight factor and the received response characteristic comes close to a predetermined value in a prescribed range of values;

computing, from the corrected first candidate of transmission weight factor and the received response characteristic, a predicted receiving power value in the terminal apparatus;

storing the computed predicted receiving power value in a storage;

setting by updating a memory of a second candidate of transmission weight factor with the corrected first candidate of transmission weight factor if a difference between a predicted receiving power value in the past stored in the storage and the predicted receiving power value computed by said computing predicted receiving power value is less than a predetermined threshold value, and setting without updating the memory of the second candidate of transmission weight factor if the difference thereof is greater than or equal to the predetermined threshold value;

inputting information to signals to be transmitted;

setting, based on the information inputted signals to be transmitted, either the first candidate of transmission weight factor or the second candidate of transmission weight factor to a memory of the transmission weight factor; and transmitting signals to the terminal apparatus based on the memory of the transmission weight factor set by the setting.

28. A program according to claim 27, wherein, if the transmission weight factor is set, without the memory of the second candidate of transmission weight factor having been updated, for longer than a predetermined period of time, the setting by updating or not updating the memory of the second candidate of transmission weight factor is such that the setting is done by updating the memory of the second candidate of transmission weight factor irrespective of the difference between the predicted receiving power value in the past stored in the storage and the thus computed predicted receiving power value.

29. A program according to claim 27, wherein as the information inputted to signals to be transmitted the inputting inputs, to a memory, information indicative of whether or not predetermined information is contained in an amplitude component of a signal to be transmitted, and wherein the setting sets the first candidate of transmission weight factor as the transmission weight factor if the predetermined information is not contained in the amplitude component of the signal, to be transmitted, inputted to the memory, whereas the setting sets the second candidate of transmission weight factor to the memory of the transmission weight factor if the predetermined information is contained in the amplitude component of the signal, to be transmitted, inputted to the memory.

30. A program according to claim 27, further including measuring the magnitude of variation in power of the received signals during a predetermined period, wherein as the information inputted to signals to be transmitted the inputting information inputs, to a memory, the magnitude of variation in power, and wherein the setting sets the first candidate of transmission weight factor to the memory of the transmission weight factor if the magnitude of variation in power inputted to the memory is less than a predetermined threshold value, whereas the setting sets the second candidate of transmission weight factor to the memory of the transmission weight factor if the magnitude of variation in power inputted to the memory is greater than or equal to the predetermined threshold value.

31. A program according to claim 27, further including measuring a power value of the received signal, wherein as the information inputted to signals to be transmitted the inputting information inputs the power value to a memory, and wherein the setting sets the first candidate of transmission weight factor to the memory of the transmission weight factor if the power value inputted to the memory is less than a predetermined threshold value, whereas the setting sets the second candidate of transmission weight factor to the memory of the transmission weight factor if the power value inputted to the memory is greater than or equal to the predetermined threshold value.

32. A program according to claim 27, further including measuring a power ratio of a power value of the signal received from the terminal apparatus to that of signals received from other terminal apparatus, wherein as the information inputted to signals to be transmitted the inputting information inputs the power ratio to a memory, and wherein the setting sets the first candidate of transmission weight factor to the memory of the transmission weight factor if the power ratio inputted to the memory is less than a predetermined threshold value, whereas said setting sets the second candidate of transmission weight factor to the memory of the transmission weight factor if the power ratio inputted to the memory is greater than or equal to the predetermined threshold value.

33. A program in a store medium executable by a computer, the program including the functions of:

receiving signals in a memory from a terminal apparatus via a plurality of antennas;

measuring the magnitude of variation in power of the signals received in the memory;

computing, from the signals received in the memory, a transmission weight factor for the terminal apparatus; and transmitting signals, based on the computed updated transmission weight factor, via the plurality of antennas if the magnitude of variation in power measured by the measuring is less than a predetermined threshold value, and transmitting signals via one of the plurality of antennas without updating the transmision weight factor if the magnitude of variation in power measured by the measuring is greater than or equal to the predetermined threshold value.

* * * * *